(12) United States Patent
Kim et al.

(10) Patent No.: US 12,491,212 B2
(45) Date of Patent: Dec. 9, 2025

(54) COMPOSITION FOR PREVENTING OR TREATING RENAL DISEASES, COMPRISING EXOSOMES DERIVED FROM PRECURSOR CELLS OF INDUCED PLURIPOTENT STEM CELL-DERIVED MESENCHYMAL STEM CELLS

(71) Applicant: BREXOGEN INC., Seoul (KR)

(72) Inventors: Sue Kim, Seoul (KR); Seul Ki Lee, Gyeonggi-do (KR)

(73) Assignee: BREXOGEN INC., Seoul (KR)

( * ) Notice: Subject to any disclaimer, the term of this patent is extended or adjusted under 35 U.S.C. 154(b) by 889 days.

(21) Appl. No.: 17/774,562

(22) PCT Filed: Nov. 11, 2020

(86) PCT No.: PCT/KR2020/015790
§ 371 (c)(1),
(2) Date: May 5, 2022

(87) PCT Pub. No.: WO2021/096220
PCT Pub. Date: May 20, 2021

(65) Prior Publication Data
US 2022/0387509 A1 Dec. 8, 2022

(30) Foreign Application Priority Data

Nov. 12, 2019 (KR) .................. 10-2019-0144420
Nov. 11, 2020 (KR) .................. 10-2020-0149965

(51) Int. Cl.
*A61K 35/28* (2015.01)
*A61P 13/12* (2006.01)
*C12N 5/074* (2010.01)

(52) U.S. Cl.
CPC .............. *A61K 35/28* (2013.01); *A61P 13/12* (2018.01); *C12N 5/0696* (2013.01)

(58) Field of Classification Search
None
See application file for complete search history.

(56) References Cited

U.S. PATENT DOCUMENTS

2016/0213817 A1* 7/2016 Brekke .................. A61K 35/30
2022/0195384 A1* 6/2022 Kim ...................... A61P 29/00

FOREIGN PATENT DOCUMENTS

| JP | 2022-542158 A | 9/2022 |
| KR | 10-2018-0003999 A | 1/2018 |
| KR | 10-2018-0063817 A | 6/2018 |
| KR | 10-2019-0083932 A | 7/2019 |
| WO | WO-2014/144462 A1 | 9/2014 |
| WO | WO-2019/135644 A1 | 7/2019 |

OTHER PUBLICATIONS

Jung et al (Circ Res 2017;120:407-417). 2017.*
International Search Report from corresponding PCT Application No. PCT/KR2020/015790, dated Mar. 29, 2021.
Van Balkom, B. W. M., et al.; "Exosomes and the kidney: prospects for diagnosis and therapy of renal diseases", Kidney International, 2011, vol. 80, pp. 1138-1145.
Dhanesha, N., et al.; "Exendin-4 ameliorates diabetic symptoms through activation of glucokinase", Journal of Diabetes, 2012, vol. 4, pp. 369-377.
Office Action of Korean Patent Application No. 10-2020-0149965, issued on Jul. 25, 2023.
Kim, S., et al.; "Exosomes Secreted from Induced Pluripotent Stem Cell-Derived Mesenchymal Stem Cells Accelerate Skin Cell Proliferation", Int. J. Mol. Sci. 2018, 19, 3119, pp. 1-16.
Office Action of China Patent Application No. 202080079648.6, issued on Jun. 14, 2023.
Cheng, J., et al., "Research progress of mesenchymal stem cell-derived exosomes in kidney diseases", Academic Journal of Second Military Medical University, Jul. 2018, vol. 39, No. 7.
Chen Y-T., et al.; "Exendin-4 and sitagliptin protect kidney from ischemia-reperfusion injury through suppressing oxidative stress and inflammatory reaction", Journal of Translational Medicine 2013, 11:270, pp. 1-19.
Gyorfi, A. H., et al.; "Targeting TGF-B signaling for the treatment of fibrosis", Matrix Biol. (2018) 68-69, 8-27.
EESR of Europe Patent Application No. 20888516.0, issued on Sep. 18, 2023.
Liu, X., et al.; "Exosomes Secreted from Human-Induced Pluripotent Stem Cell-Derived Mesenchymal Stem Cells Prevent Osteonecrosis of the Femoral Head by Promoting Angiogensis", J Transl Med.Feb. 1, 2015:13:49, pp. 232-244.
Farzamfar, S., et al.; "Extracellular micro/nanovesicles rescue kidney from ischemia-reperfusion injury", J Cell Physiol. Aug. 2019:234(8):12290-12300.. Epub Jan. 4, 2019.
Kim, S., et al., "Geration of mesenchymal stem-like cells for producing extracellular vesices", World J Stem Cells. May 26, 2019;11(5):270-280.
Office Action of Japan Patent Application No. 2022-527079, issued on May 16, 2023.

(Continued)

*Primary Examiner* — Blaine Lankford
(74) *Attorney, Agent, or Firm* — Harness, Dickey & Pierce, P.L.C.

(57) ABSTRACT

The present invention relates to a pharmaceutical composition for preventing or treating renal diseases, comprising, as an active ingredient, exosomes isolated from precursor cells of induced pluripotent stem cell-derived mesenchymal stem cells, the precursor cells having been treated or not having been treated with a pretreatment material. Exosomes of the present invention exhibit an effect of preventing or treating renal diseases that is more improved than that of exosomes isolated from conventional mesenchymal stem cells, thereby being effectively usable for relevant research and development and productization.

7 Claims, 35 Drawing Sheets

Specification includes a Sequence Listing.

(56) References Cited

OTHER PUBLICATIONS

Yun, C. W., et al.; "Potential and Therapeutic Efficacy of Cell-based Therapy Using Mesenchymal Stem Cells for Acute-chronic Kidney Disease", Int J Mol Sci. Apr. 1, 2019;20(7):1619, pp. 1-16.
Office Action of Korean Patent Application No. 10-2020-0149965, issued on Jan. 28, 2023.
ExoQuick™ Exosome Precipitation Solution User Manual, SBI System Biosciences, Version 10, Jan. 30, 2017, 12 pages.
Yuan et al.; "Extracellular vesicles from human-induced pluripotent stem cell-derived mesenchymal stromal cells (hiPSC-MSCs) protect against renal ischemia/reperfusion injury via delivering specificity protein (SP1) and transcriptional activating of sphingosine kinase 1 and inhibiting necroptosis", Cell Death and Disease (2017) 8:3200.

\* cited by examiner

BxC-e

FIG. 1b

BxC-V37e

FIG. 3d

TGFβ+e

COMPOSITION FOR PREVENTING OR TREATING RENAL DISEASES, COMPRISING EXOSOMES DERIVED FROM PRECURSOR CELLS OF INDUCED PLURIPOTENT STEM CELL-DERIVED MESENCHYMAL STEM CELLS

CROSS-REFERENCE TO RELATED APPLICATIONS

This application is a national phase application of PCT Application No. PCT/KR2020/015790, filed on Nov. 11, 2020, which claims priority to Korean Patent Application Nos. 10-2019-0144420, filed on Nov. 12, 2019 and 10-2020-0149965, filed on Nov. 11, 2020. The entire disclosures of the applications identified in this paragraph are incorporated herein by reference.

TECHNICAL FIELD

The present disclosure relates to a composition for prevention or treatment of kidney disease, the composition comprising, as an active ingredient, exosomes derived from induced pluripotent stem cell-derived mesenchymal stem cell progenitor cells treated with or without a pretreatment material.

BACKGROUND ART

Mesenchymal stem cells are multipotent stromal cells that can differentiate into a variety of cell types including osteoblasts, chondrocytes, myocytes, adipocytes, and the like. Having a potential of differentiating into various connective tissues such as cartilages, bone tissues, ligaments, bone marrow stroma, etc., mesenchymal stem cells are being studied for use in therapy of various diseases including soft tissue defects caused by arthritis, trauma, burn, etc.

Recently, active research has been being conducted for therapeutic effects on various diseases, using exosomes secreted by mesenchymal stem cells, but not mesenchymal stem cells themselves. A plenty of quality exosomes is required for commercial use thereof. However, only a small amount of exosome is obtained from mesenchymal stem cells and the function and proliferative ability of mesenchymal stem cells decreases with passages thereof. Thus, a need for a technique for establishing highly proliferative cells equivalent or superior to mesenchymal stem cells in terms of functionality has emerged.

The kidneys are a pair of organs located on the left and right in the retroperitoneal space. Each kidney contains around 1 million nephrons, which are structural and functional units. One nephron is composed of a tuft of capillaries, called glomerulus, and a renal tubule, which are responsible for filtration and absorption.

Kidney disease is a condition in which the kidneys are generally damaged or undergo abnormalities, failing to normally perform excretion, control, metabolism, and endocrine functions. Kidney disease is classified into acute and chronic kidney diseases according to progression thereof. Also, pathological factors are used as criteria for classification into: glomerulonephritis due to the inflammation of small blood vessels in the kidneys; diabetic nephropathy due to the complication of diabetes mellitus or hypertension, toxic nephropathy due to the effect of a drug such as an antibiotic or an anticancer agent, and urinary tract infection due to bacterial infection.

Kidney disease is apt to develop into chronic renal dysfunction irrespective of causes thereof. Once being lowered to 50% or less, the glomerular filtration rate continues, for the most part, to decrease, ultimately giving rise to kidney failure. This disease is usually accompanied with the incidence of complications, such as serological abnormality, neurologic complications, gastrointestinal complications, immunological complications, infections, or osteodystrophy, which may lead to death when seriously aggravated.

Kidney disease is increasing in incidence every year around the world, and moreover, the patients with kidney failure are often diagnosed to be in a terminal stage even at an initial diagnosis as the symptoms do not appear or are not well recognized. As of the time, kidney failure cases amount to approximately 450,000 in South Korea, but are predicted to be higher in consideration of undetected early kidney failure. Periodical dialysis and renal transplantation, although suggested as therapeutic means for kidney failure, cannot become solutions to the problems with early- and mid-stage chronic kidney failure, and put a severe economic burden on countries and patient families due to the high cost thereof.

Therefore, there is a growing demand for the development of a new therapeutic composition suitable for the safer and more effective treatment of kidney disease.

SUMMARY

Technical Problem

Leading to the present disclosure, intensive and thorough research, conducted by the present disclosure, into the development of a therapeutic agent employing exosomes of mesenchymal stem cells to treat kidney disease, resulted in the finding that when progenitor cells of mesenchymal stem cell in a less undifferentiated stage than the mesenchymal stem cells derived from induced pluripotent stem cells (iPSCs) were pretreated with or without a pretreatment material, exosomes from the iPSC-derived mesenchymal stem cell progenitors exhibit excellent prophylactic and therapeutic effects on kidney disease.

Therefore, an aspect of the present disclosure is to provide a pharmaceutical composition comprising exosomes isolated from progenitor cells of induced pluripotent stem cell (iPSC)-derived mesenchymal stem cells (MSCs) as an active ingredient for prevention or treatment of kidney disease.

Another aspect of the present disclosure is to provide exosomes isolated from progenitor cells of induced pluripotent stem cell (iPSC)-derived mesenchymal stem cells (MSCs).

A further object of the present disclosure is to provide a pharmaceutical composition for prevention or treatment of kidney disease, the composition comprising, as an active ingredient, exosomes isolated from induced pluripotent stem cell (iPSC)-derived mesenchymal stem cell (MSC) progenitor cells treated with a pretreatment material.

Further another object of the present disclosure is to provide exosomes isolated from induced pluripotent stem cell (iPSC)-derived mesenchymal stem cell (MSC) progenitor cells treated with a pretreatment material.

Solution to Problem

Intensive and thorough research were conducted by the present disclosure in order to develop a therapeutic agent employing exosomes of mesenchymal stem cells for treating kidney disease. As a result, progenitor cells in a less undifferentiated stage than mesenchymal stem cells derived from induced pluripotent stem cells (iPSCs) were established. When the progenitor cells were treated with or without a pretreatment material, exosomes isolated from the progenitor cells of the iPSC-derived mesenchymal stem cells were found to exhibit excellent prophylactic and therapeutic effects on kidney disease.

The present disclosure relates to exosomes isolated from progenitor cells of induced pluripotent stem cell (iPSC)-derived mesenchymal stem cells (MSCs), a pharmaceutical composition comprising the same as an active ingredient for prevention or treatment of kidney disease, exosomes isolated from pretreatment material-treated progenitor cells of induced pluripotent stem cell (iPSC)-derived mesenchymal stem cells (MSCs) and a pharmaceutical composition comprising the same as an active ingredient for prevention or treatment of kidney disease.

Below, a detailed description will be given of the present disclosure.

An aspect of the present disclosure pertains to a pharmaceutical composition comprising exosomes isolated from progenitor cells of induced pluripotent stem cell (iPSC)-derived mesenchymal stem cells (MSCs) as an active ingredient for prevention or treatment of kidney disease.

As used herein, the term "stem cell" refers to an undifferentiated cell with self-renewal and potency to differentiate into two or more different types of cells. The stem cells of the present disclosure may be autologous or allogenic stem cells.

As used herein, "induced pluripotent stem cell" (iPSC) refers to a pluripotent cell that is dedifferentiated from an already differentiated cell, such as a somatic cell, back to the initial undifferentiated state.

The dedifferentiation is induced by introducing and expressing specific genes (e.g., Sox2, c-Myc, Klf4, Oct-4, etc.) or by introducing dedifferentiation inducing proteins expressed in cells possessing the specific genes therein.

Pluripotency describes the ability of a cell to differentiate into the three primary germ cell layers of the early embryo, that is, tissues or organs of endoderm, mesoderm, and ectoderm origins.

As used herein, the term "mesenchymal stem cell" refers to a pluripotent cell having the potential of differentiating into various cells including osteoblast cells, chondrocytes, myocytes, adipocytes, and the like. The mesenchymal stem cells may be, for the most part, bone marrow-derived mesenchymal stem cells and may be derived from umbilical cord or umbilical cord blood, adipose tissues, amniotic fluid, tooth buds of molar teeth in addition to the bone marrow. The mesenchymal stem cell is also called stromal cell.

Herein, the progenitor cells of mesenchymal stem cells, developed by the present inventors, are progenitor cells of mesenchymal stem cells derived from induced pluripotent stem cells (iPSCs), but not general mesenchymal stem cells.

The term "induced pluripotent stem cells" refers to cells that had been induced to have pluripotent differentiation potential through an artificial reprogramming process from differentiated cells, and also called reprogrammed stem cells.

The artificial reprogramming process is performed by the introduction of viral-mediated reprogramming factors using retroviruses, lentiviruses, and Sendai viruses, or non-viral-mediated reprogramming factors using non-viral vectors, proteins, and cellular extracts, or the process includes reprogramming by stem cell extracts, compounds, and the like.

Induced pluripotent stem cells have almost the same characteristics as embryonic stem cells, and specifically show similar cell morphology, are similar in view of gene and protein expression patterns, have in vitro and in vivo pluripotency, form teratoma, form chimeric mice when inserted into mouse blastocysts, and enable germ line transmission of genes.

The induced pluripotent stem cells of the present disclosure include induced pluripotent stem cells derived from all mammalian species, such as humans, monkeys, pigs, horses, cows, sheep, dogs, cats, mice, rats, and rabbits, but are preferably human-derived induced pluripotent stem cells.

In addition, somatic cells before reprogramming into the induced pluripotent stem cells may be somatic cells derived from umbilical cord, cord blood, bone marrow, fat, muscle, nerve, skin, amniotic membrane, amniotic fluid, or placenta, but are not limited thereto.

Specifically, the somatic cells include fibroblasts, hepatocytes, adipose cells, epithelial cells, epidermal cells, chondrocytes, muscle cells, cardiac muscle cells, melanocytes, neural cells, glial cells, astroglial cells, monocytes, and macrophages, but are not limited thereto.

In an embodiment of the present disclosure, the progenitor cells of mesenchymal stem cells of the present disclosure express at least one gene selected from the group consisting of ANKRD1, CPE, NKAIN4, LCP1, CCDC3, MAMDC2, CLSTN2, SFTA1P, EPB41L3, PDE1C, EMILIN2, SULT1C4, TRIM58, DENND2A, CADM4, AIF1L, NTM, SHISA2, RASSF4, and ACKR3 at a higher level than the equal number of the mesenchymal stem cells.

In another embodiment, the progenitor cells of mesenchymal stem cells of the present disclosure express at least one gene selected from the group consisting of DHRS3, BMPER, IFI6, PRSS12, RDH10, and KCNE4 at a lower level than the equal number of the mesenchymal stem cells.

The progenitor cells of mesenchymal stem cells and an equal number of mesenchymal stem cells are derived from allogenic tissues. More specifically, the progenitor cells of mesenchymal stem cells are progenitor cells of mesenchymal stem cells derived from induced pluripotent stem cells.

In an embodiment of the present disclosure, the progenitor cells of mesenchymal stem cells are progenitor cells of mesenchymal stem cells derived from umbilical cord tissue-derived induced pluripotent stem cells, and the mesenchymal stem cells compared in an equal number therewith are umbilical cord tissue-derived mesenchymal stem cells.

The present inventors named the progenitor cells of induced pluripotent stem cell-derived mesenchymal stem cells as Brexogen stem cells (BxC). Herein, the "progenitor cells of induced pluripotent stem cell-derived mesenchymal stem cells (BxC)" is also expressed as "induced pluripotent stem cell-derived mesenchymal progenitor cells".

The progenitor cells (BxC) of mesenchymal stem cells of the same tissue (e.g., umbilical cord tissue)-derived induced pluripotent stem cells according to the present disclosure had no chromosomal karyotype abnormalities and is excellent in proliferative capacity compared with mesenchymal stem cells (MSC) derived from the same tissue (e.g., umbilical cord tissue). In detail, when undergoing nine or more passages, the BxC of the present disclosure exhibited 10-fold or greater proliferative capacity than mesenchymal stem cells (MSC) derived from the same tissue. Even after 12 or more passages, the proliferative capacity is not observed to decrease. Compared with MSCs, BxC also showed 2-fold or higher expression levels of Ki67, which is a marker associated with cell proliferative capacity.

The progenitor cells (BxC) of induced pluripotent stem cell-derived mesenchymal stem cells secret larger amounts of functional proteins, such as endostatin, endothelin-1, VEGF-A, thrombospondin-2, PlGF, PDGF-AA, beta-NGF, and HB-EGF, compared with an equal number of mesenchymal stem cells.

Endostatin is a 20-kDa C-terminal fragment derived from naturally occurring type XVIII collagen, and is reported as an anti-angiogenic agent.

Endothelin-1, also known as preproendothelin-1 (PPET1), is a protein that is encoded by EDN1 gene and produced in vascular endothelial cells. Endothelin-1 functions as a strong vasoconstrictor.

Vascular endothelial growth factor A (VEGF-A) is a protein encoded by VEGFA gene and functions to induce vascular growth through interactions with VEGFR1 and VEGFR2 of vascular endothelial cells.

Thrombospondin-2 is a protein encoded by THBS2 gene and functions to mediate cell-cell interactions or cell-matrix interactions. Thrombospondin-2, although controversial for its role in cancer, is known to regulate cell surface characteristics of mesenchymal stem cells and to be involved in cell adhesion and cell migration.

Placental growth factor (PlGF) is a protein encoded by PGF protein and is a member of the VEGF sub-family that plays a main role in angiogenesis and vasculogenesis during embryogenesis.

Platelet-derived growth factor (PDGF-AA) is a growth factor that regulates cell growth and division and plays a significant role in blood vessel formation, the growth of blood vessels, and the proliferation, chemotaxis, and migration of mesenchymal stem cells.

Nerve growth factor (NGF) is a neurotrophic factor and neuropeptide mainly involved in growth, maintenance, proliferation, and survival of neurons. NGF is a complex of three proteins (alpha-NGF, beta-NGF, and gamma-NGF) expressed at a ratio of about 2:1:2. Gamma-NGF functions as serine protease, and cleaves the N-terminal of beta-NGF to activate NGF.

Heparin-binding EGF-like growth factor (HB-EGF) is a member of the EGF family of proteins that is encoded by HBEGF gene. HB-EGF has been shown to plays a key role in cardiac development and vasculature and is essential for epithelialization required for cutaneous wound healing.

As used herein, the term "exosome" refers to a membrane vesicle that is extracellularly secreted from a cell or has a membrane structure composed of a lipid-bilayer present in the cell, and the exosome exists in the body fluid of almost all eukaryotes. Exosomes have a diameter of approximately 30-100 nm, and exosomes are released from cells when multivesicular bodies are fused to cell membranes, or released directly from cell membranes. Exosomes are well known to serve to transport intracellular biomolecules, such as proteins, bioactive lipids, and RNA (miRNA), so as to perform a functional role of mediating coagulation, cell-cell communication, and cellular immunity.

The concept of exosomes encompasses microvesicles. The marker proteins of exosomes are known to be CD63, CD81, or the like. In addition, cell surface receptors such as EGFR, signaling-related molecules, cell adhesion-related proteins, MSC-associated antigens, heat shock proteins, and vesiculation-related Alix are also known.

Herein, the exosomes isolated from progenitor cells of induced pluripotent stem cell (iPSC)-derived mesenchymal stem cells (MSCs) may be those present within the progenitor cells (BxC) of iPS-derived MSCs or those released from BxC.

As used herein, the term "comprising as an active ingredient" means comprising exosomes isolated from progenitor cells of induced pluripotent stem cell (iPSC)-derived mesenchymal stem cells (MSCs) in a sufficient amount to achieve preventive or therapeutic activity for kidney disease.

Examples of the kidney disease include, but are not limited to, renal fibrosis, diabetic nephropathy, hypertensive nephropathy, glomerulitis, pyelonephritis, interstitial nephritis, lupus nephritis, polycystic kidney disease, kidney failure, glomerulosclerosis, acute rejection after transplantation, and/or drug-caused kidney damage.

The drug may be an anticancer agent, for example, cisplatin, but is not limited thereto.

As used herein, the term "prevention" refers to all acts of suppressing a kidney disease or disorder or delaying the progress of a kidney disease or disorder by administering the composition of the present disclosure.

As used herein, the term "treatment" refers to: (a) suppressing the development of a kidney disease; (b) alleviating a kidney disease; and (c) removing a kidney disease.

The pharmaceutical composition of the present disclosure may comprise a pharmaceutically acceptable carrier in addition to the active ingredient. Any pharmaceutically acceptable carrier that is usually used for formulation may be available in the present disclosure. Examples of the carrier include, but are not limited to, lactose, dextrose, sucrose, sorbitol, mannitol, starch, acacia gum, calcium phosphate, alginate, gelatin, calcium silicate, microcrystalline cellulose, polyvinylpyrrolidone, cellulose, water, syrup, methyl cellulose, methyl hydroxybenzoate, propyl hydroxybenzoate, talc, magnesium stearate, mineral oil, and the like. Besides, the pharmaceutical composition of the present disclosure may further comprise a lubricant, a humectant, a sweetener, a flavoring agent, an emulsifier, a suspending agent, a preservative, and the like.

The pharmaceutical composition of the present disclosure may be administered orally or parenterally (e.g., intravenously, subcutaneously, intraperitoneally, or topically). The dose of the pharmaceutical composition may be appropriately selected by a person skilled in the art according to the state and weight of the patient, the severity of disease, the type of drug, and the route and duration of administration.

The pharmaceutical composition of the present disclosure may be administered at a pharmaceutically effective dose. As used herein, the term "pharmaceutically effective dose" refers to an amount that is sufficient to treat a disease at a reasonable benefit/risk ratio applicable to medical therapy. The effective amount may vary depending on various factors including the type of disease, the severity of disease, drug activity, sensitivity to the drug, the mode of administration, the route of administration, excretion rate, the duration of treatment, drugs simultaneously used, and other elements well known in the medicinal field.

The pharmaceutical composition of the present disclosure may be administered as a single therapeutic agent or in combination with other therapeutic agent(s). In this regard, the pharmaceutical composition may be administered sequentially or simultaneously with conventional therapeutic agent(s) and at a single dose or multiple doses. In consideration of all the factors, it is important to administer a minimal amount that can bring about a maximum effect without adverse effects, and the amount can be readily determined by those skilled in the art.

In detail, the dose of the pharmaceutical composition of the present disclosure may vary depending on factors including patient's age, sex, state, and weight, in-vivo absorption rate, inactivation rate, and excretion rate of the active ingredient, kinds of disease, and drugs to be co-administered.

Another aspect of the present disclosure pertains to exosomes isolated from progenitor cells of induced pluripotent stem cell (iPSC)-derived mesenchymal stem cells (MSCs).

The exosomes (BxC-e) isolated from progenitor cells of induced pluripotent stem cell (iPSC)-derived mesenchymal stem cells (MSCs) according to the present disclosure retain the trait of conventional exosomes. As will be demonstrated in the Examples, below, the exosomes isolated from progenitor cells of induced pluripotent stem cell (iPSC)-derived mesenchymal stem cells (MSCs) has an excellent effect of regenerating renal cells (FIG. 2). In addition, BxC-e of the present disclosure was identified to inhibit cell death as well as inflammation in the kidney failure-induced renal cells and suppress endoplasmic reticulum stress (FIGS. 4a to 6b).

A further aspect of the present disclosure pertains to a method for treating a kidney disease, the method comprising a step of administering exosomes isolated from progenitor cells of induced pluripotent stem cell (iPSC)-derived mesenchymal stem cells (MSCs) to a subject.

The term "subject", as used herein, refers to a target in need of treatment of the disease and is intended to encompass humans, non-human primates, and mammals such as mice, dogs, cats, horses, and cattle.

Yet another aspect of the present disclosure pertains to a use of exosomes isolated from progenitor cells of induced pluripotent stem cell (iPSC)-derived mesenchymal stem cells (MSCs) in treating a kidney disease.

Since the kidney disease treating method and the therapeutic use share constituents with the exosomes isolated from iPSC-derived MSC progenitor cells and the pharmaceutical composition comprising same, the common contents therebetween are omitted in order to avoid undue complexity of the specification.

A yet further aspect of the present disclosure pertains to a pharmaceutical composition for prevention or treatment of a kidney disease, the composition comprising, as an active ingredient, the exosomes isolated from induced pluripotent stem cell (iPSC)-derived mesenchymal stem cell (MSC) progenitor cells treated with a pretreatment material.

As used herein, the term "pretreatment" refers to a process of contacting induced pluripotent stem cell (iPSC)-derived mesenchymal stem cell (MSC) progenitor cells with a cell culture medium containing a pretreatment material in a culturing procedure.

The pretreatment may be conducted by culturing the progenitor cells of induced pluripotent stem cell (iPSC)-derived mesenchymal stem cells (MSCs) in a cell culture medium containing the pretreatment material.

So long as it is usually available for culturing animal cells, any medium may be used in the present disclosure. Examples of the cell culture medium include DMEM (Dulbecco's modification of Eagle's medium), a mixture of DMEM and F12, Eagle's MEM (Eagle's minimum essential medium), α-MEM, Iscove's MEM, 199 medium, CMRL 1066, RPMI 1640, F12, F10, Way-mouth's MB752/1, McCoy's 5A, and MCDB series.

The culturing may be conducted for 6 to 48 hours.

In detail, the culturing may be conducted 6 to 42 hours, 6 to 36 hours, 6 to 30 hours, 6 to 27 hours, 12 to 48 hours, 12 to 42 hours, 12 to 36 hours, 12 to 30 hours, 12 to 27 hours, 18 to 48 hours, 18 to 42 hours, 18 to 36 hours, 18 to 30 hours, 18 to 27 hours, 21 to 48 hours, 21 to 42 hours, 21 to 36 hours, 21 to 30 hours, or 21 to 27 hours.

The pretreatment material may be exendin-4.

Exendin-4 is a peptide agonist of glucagon-like peptide (GLP) receptor. Exendin-4 promotes insulin secretion and has been clinically used for treatment of diabetes mellitus type II and Parkinson's disease.

Exendin-4 may be contained at a concentration of 1 to 100 nM in a cell culture medium.

In detail, exendin-4 may be contained at a concentration of 1 to 90 nM, 1 to 80 nM, 1 to 70 nM, 1 to 60 nM, 1 to 50 nM, 1 to 40 nM, 1 to 30 nM, 10 to 90 nM, 10 to 80 nM, 10 to nM, 10 to 60 nM, 10 to 50 nM, 10 to 40 nM, and 10 to 30 nM in a cell culture medium.

The pretreatment material may be lanifibranor.

Lanifibranor is a small molecule acting as a peroxisome proliferator-activated receptor (PPAR) agonist to activate the three PPAR isomers PPARα, PPARδ, and PPARγ to induce antifibrosis, antiinflammation, and a beneficial metabolism change in the body. PPARs are ligand-activated transcription factors of nuclear hormone receptor superfamily which regulate the expression of genes. PPARs are play essential roles in the regulation of cellular differentiation, development, and tumorigenesis. When activated, PPAR that regulates fibrosis is known to reduce abnormal growth of connective tissues. In addition, lanifibranor has been clinically used as a therapeutic agent for systemic sclerosis, idiopathic lung fibrosis, etc.

Lanifibranor may be contained at a concentration of 1 to 100 nM in a cell culture medium.

In detail, lanifibranor may be contained at a concentration of 1 to 1000 µM, 1 to 500 µM, 1 to 100 µM, 1 to 90 µM, 1 to 80 µM, 1 to 70 µM, 1 to 60 µM, 1 to 50 µM, 1 to 40 µM, 1 to 30 µM, 1 to 20 µM, 5 to 1000 µM, 5 to 500 µM, 5 to 100 µM, 5 to 90 µM, 5 to 80 µM, 5 to 70 µM, 5 to 60 µM, 5 to 50 µM, 5 to 40 µM, 5 to 30 µM, or 5 to 20 µM in a cell culture medium.

Still another aspect of the present disclosure pertains to exosomes isolated from progenitor cells of induced pluripotent stem cell (iPSC)-derived mesenchymal stem cell (MSC) progenitor cells treated with a pretreatment material.

The exosomes (BxC-G63e) isolated from progenitor cells of induced pluripotent stem cell (iPSC)-derived mesenchymal stem cell (MSC) progenitor cells pretreated with a pretreatment material retain the trait of conventional exosomes. As will be demonstrated in the Examples, below, BxC-G63e of the present disclosure was identified to inhibit cell death as well as inflammation in the kidney failure-induced renal cells and suppress endoplasmic reticulum stress (FIGS. 4a to 6b).

A yet still further aspect of the present disclosure pertains to a method for treating a kidney disease, the method comprising a step of administering exosomes isolated from induced pluripotent stem cell (iPSC)-derived mesenchymal stem cell (MSC) progenitor cells treated with a pretreatment material to a subject.

The term "subject", as used herein, refers to a target in need of treatment of the disease and is intended to encompass humans, non-human primates, and mammals such as mice, dogs, cats, horses, and cattle.

Yet further another aspect of the present disclosure pertains to a use of exosomes isolated from induced pluripotent stem cell (iPSC)-derived mesenchymal stem cell (MSC) progenitor cells pretreated with a pretreatment material in treating a kidney disease.

Since the kidney disease treating method and the therapeutic use share constituents with the exosomes isolated from iPSC-derived MSC progenitor cells pretreated with a pretreatment material and the pharmaceutical composition comprising same, the common contents therebetween are omitted in order to avoid undue complexity of the specification.

Advantageous Effects of Invention

The present disclosure is concerned with a pharmaceutical composition comprising exosomes isolated from iPSC-derived MSC progenitor cells treated with or without a pretreatment material as an active ingredient for prevention or treatment of a kidney disease. Exhibiting more improved prophylactive or therapeutic effects on kidney disease, compared to conventional exosomes isolated from mesenchymal stem cells, the exosomes of the present disclosure can be advantageously applied to the related research and development and commercialization.

BRIEF DESCRIPTION OF THE DRAWINGS

FIG. 1b is an electron microscope image of exosomes (BxC-e) isolated from iPSC-derived MSC progenitor cells (BxC).

FIG. 3d is an electron microscope image of exosomes (BxC-V37e) isolated from iPSC-derived MSC progenitor cells (BxC) pretreated with lanifibranor.

BEST MODE FOR CARRYING OUT THE INVENTION

A pharmaceutical composition comprising induced pluripotent stem cell (iPSC)-derived mesenchymal stem cell (MSC) progenitor cells as an active ingredient for prevention or treatment of kidney disease.

DETAILED DESCRIPTION

A better understanding of the present disclosure may be obtained from the following Examples which are set forth to illustrate, but are not to be construed as limiting the present disclosure.

Throughout the specification, the term "%" used to express the concentration of a specific material, unless otherwise particularly stated, refers to (wt/wt) % for solid/solid, (wt/vol) % for solid/liquid, and (vol/vol) % for liquid/liquid.

Preparation Example: Isolation and Culturing of Induced Pluripotent Stem Cell (iPSC)-Derived Mesenchymal Stem Cell Progenitor Cell (BxC)

First, induced pluripotent stem cells (iPSC) were cultured in DMEM supplemented with 10% FBS and 10 ng/ml bFGF for 7 days. Then, stage-specific embryonic antigen 4 (SSEA-4) (−) cells, which have no SSEA-4 protein expressed on the surface thereof, were isolated from the cultured induced pluripotent stem cells through FACS. The isolated SSEA-4 (−) cells were passaged, and further cultured in the same medium as above for 7 days, thereby preparing progenitor cells of induced pluripotent stem cell-derived mesenchymal stem cells of the present disclosure. The progenitor cells of induced pluripotent stem cell (iPSC)-derived mesenchymal stem cells (MSCs) were named BxC (brexogen stem cell).

The progenitor cells of iPSC-derived MSCs, named BxC, were further cultured in a culture medium [high glucose DMEM (Gibco, Cat no. 11995-065), 10% Fetal bovine Serum (HyClone), 1% MEM Non-Essential Amino Acids Solution (100×)(Gibco, Cat no. 11140-050)].

Example 1: Isolation of Exosomes from iPSC-Derived MSC Progenitor Cell (BxC)

The culture medium in which the induced pluripotent stem cell (iPSC)-derived mesenchymal stem cell (MSC) progenitor cells (hereinafter referred to as "BxC") had been cultured was collected and centrifuged at 300×g for 10 min to remove the cells and cell debris as a pellet. The supernatant was filtered through a 0.22-μm filter and centrifuged at 10,000×g and 4° C. for 70 min using a high-speed centrifuge. The supernatant thus formed was again centrifuged at 100,000×g and 4° C. for 90 min using an ultracentrifuge. After removal of the supernatant, exosomes were obtained as a pellet, diluted in PBS (phosphate buffered saline), and used in subsequent experiments.

Experimental Example 1: Characterization of iPSC-MSC Progenitor Cell (BxC)-Derived Exosome The exosomes (hereinafter referred to as "BxC-e") isolated in Example 1 were measured for size distribution by nanoparticle tracking assay (NanoSight NS300, Malvern) and morphologically identified using an electron microscope.

Figure 1A:
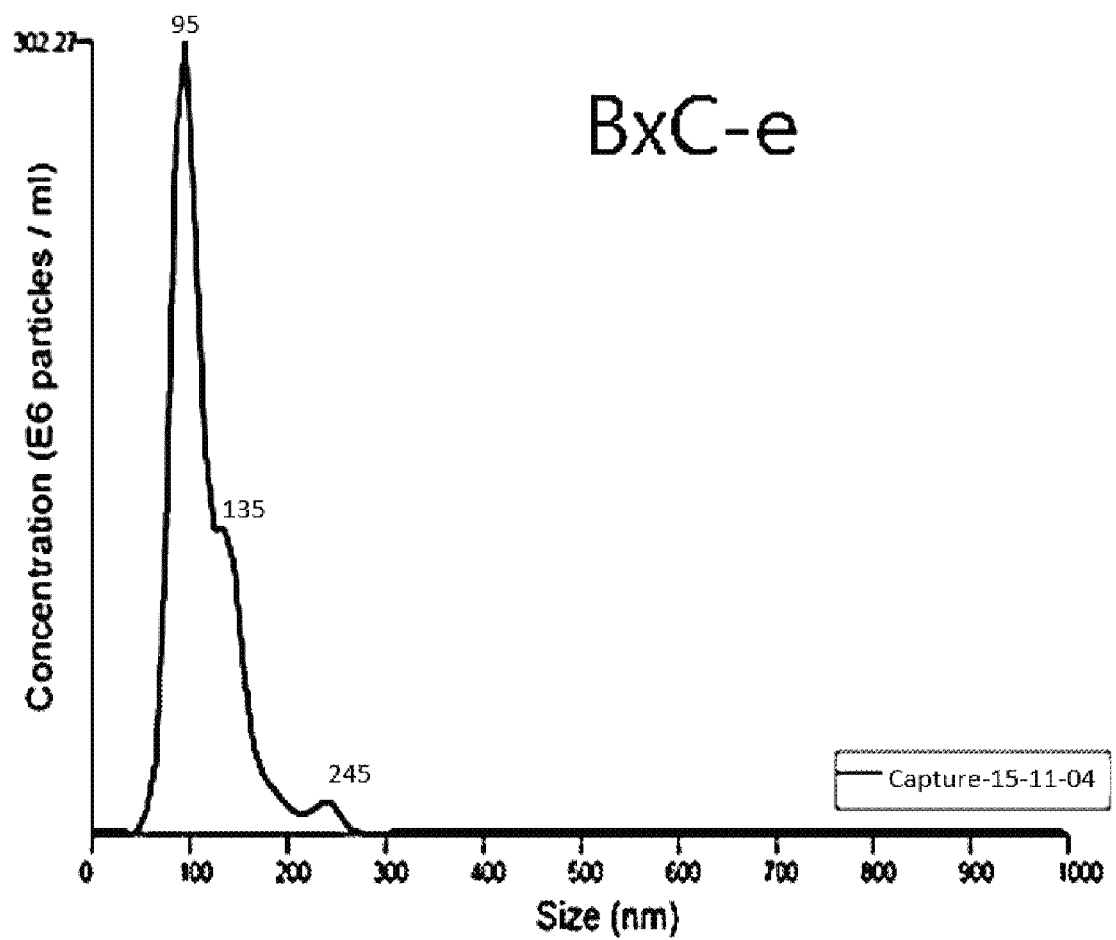
FIG. 1a is a plot of the mean size and distribution of exosomes (BxC-e) isolated from iPSC-derived MSC progenitor cells (BxC).
Figure 1B:
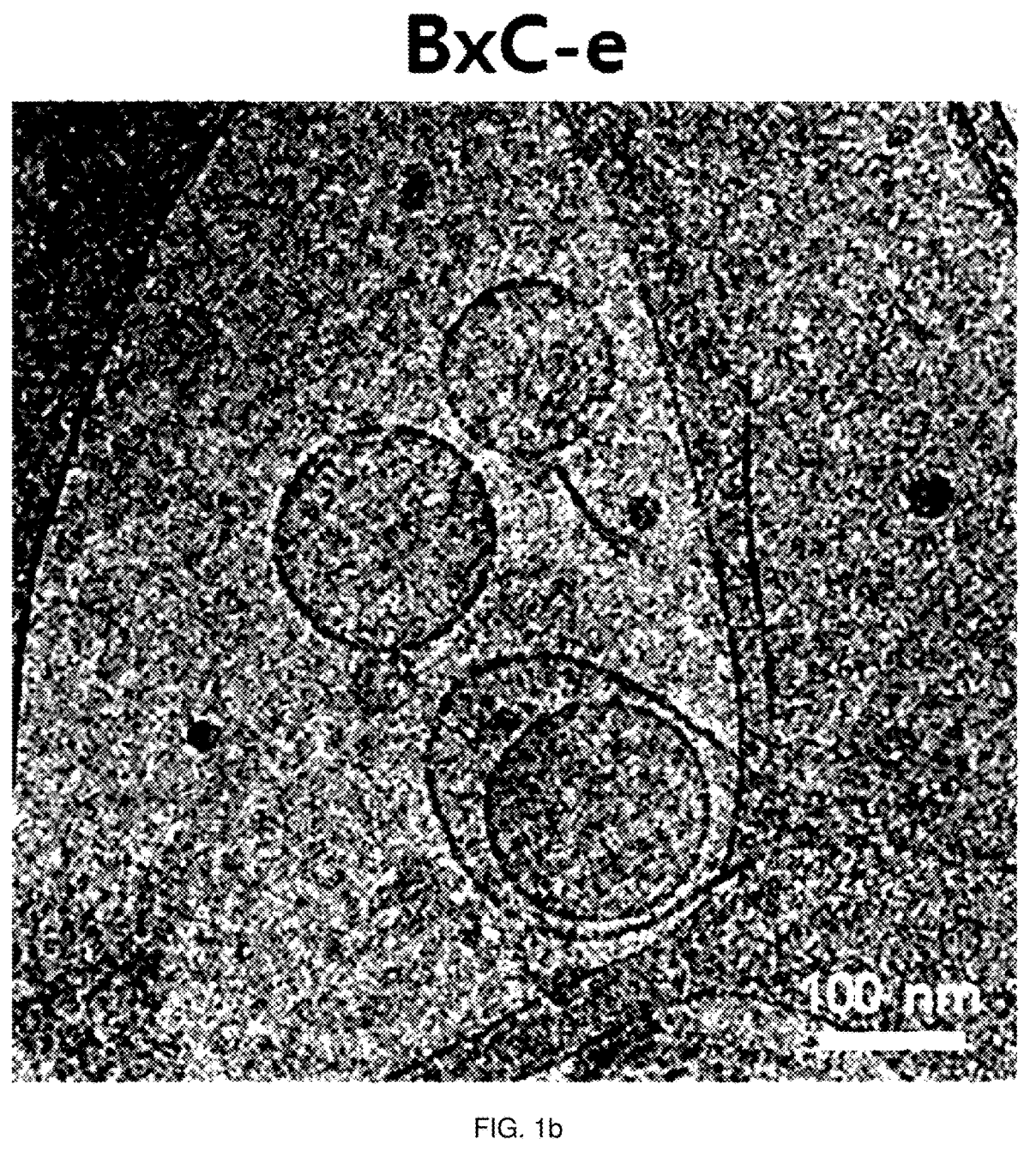

As shown in FIGS. 1a and 1b, the exosomes from BxC were observed to retain the trait of exosomes themselves.

Experimental Example 2: Effect of Exosome Isolated from iPSC-Derived MSC Progenitor Cell on Regeneration of Renal Cell Examination was made of the regenerative effect of the exosomes isolated in Example 1 on renal cells damaged by treatment with cisplatin or LPS (lipopolysaccharide).

2-1. Cisplatin Damage

First, the epithelial cell line HK-2 (Korean Cell Line Bank) and the kidney epithelial cells RPTEC (Renal Proximal Tubule Epithelial Cells, Lonza, CC-2553) and GEC (Glomerular Endothelial Cells, Cell Systems, ACBRI 128) were each seeded at a density of $1 \times 10^4$ cells/well into 96-well culture dishes.

At 16 hours after cell seeding, the cells were checked for the state thereof and treated for 24 hours with 25 μM cisplatin (Sigma P4394) in a serum-free growth medium. After 24 hours, the supernatant was discarded and the cells were washed with DPBS (HyClone SH30028.02) and incubated for 48 hours with 50 μg (low dose) or 100 μg (high dose) of the exosomes isolated in Example 1 in a fresh serum-free growth medium.

Finally, 10 μL of CCK-8 solution (cell counting kit-8, Enzo ALX-850-039-KI01) was added, followed by incubation at 37° C. for 2 hours in a $CO_2$ incubator. A color change appeared and absorbance at 450 nm was read.

2-2. LPS Damage

An experiment was carried out in the same manner as in Experimental Example 2-1 with the exception of treatment with 20 μg/mL LPS (Sigma L2880) instead of cisplatin.

Figure 2A:
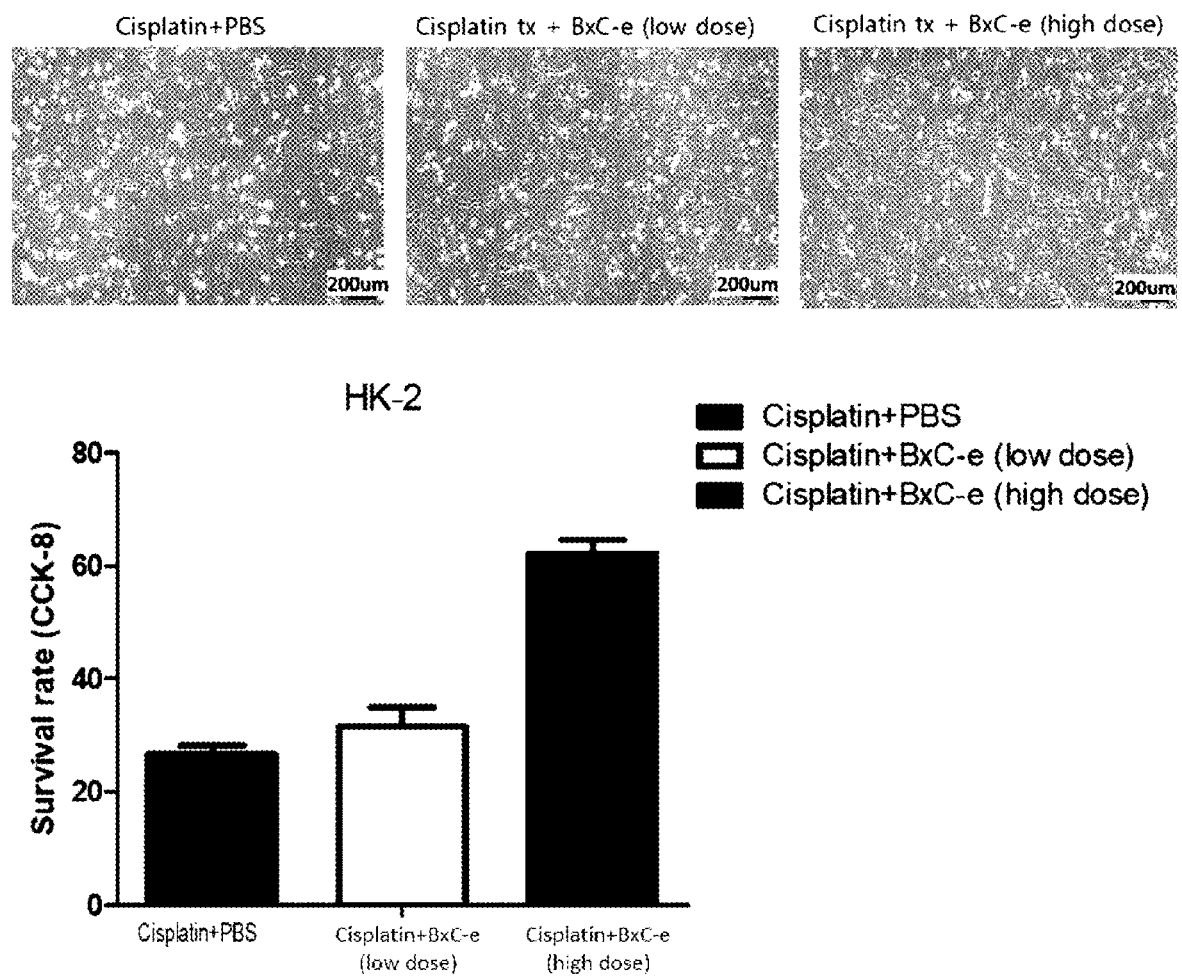
FIGS. 2a, 2b and 2c are images and graphs elucidating the renal cell regenerating effect of exosomes (BxC-e) isolated from iPSC-derived MSC progenitor cells (BxC) in various renal cells.
Figure 2B:
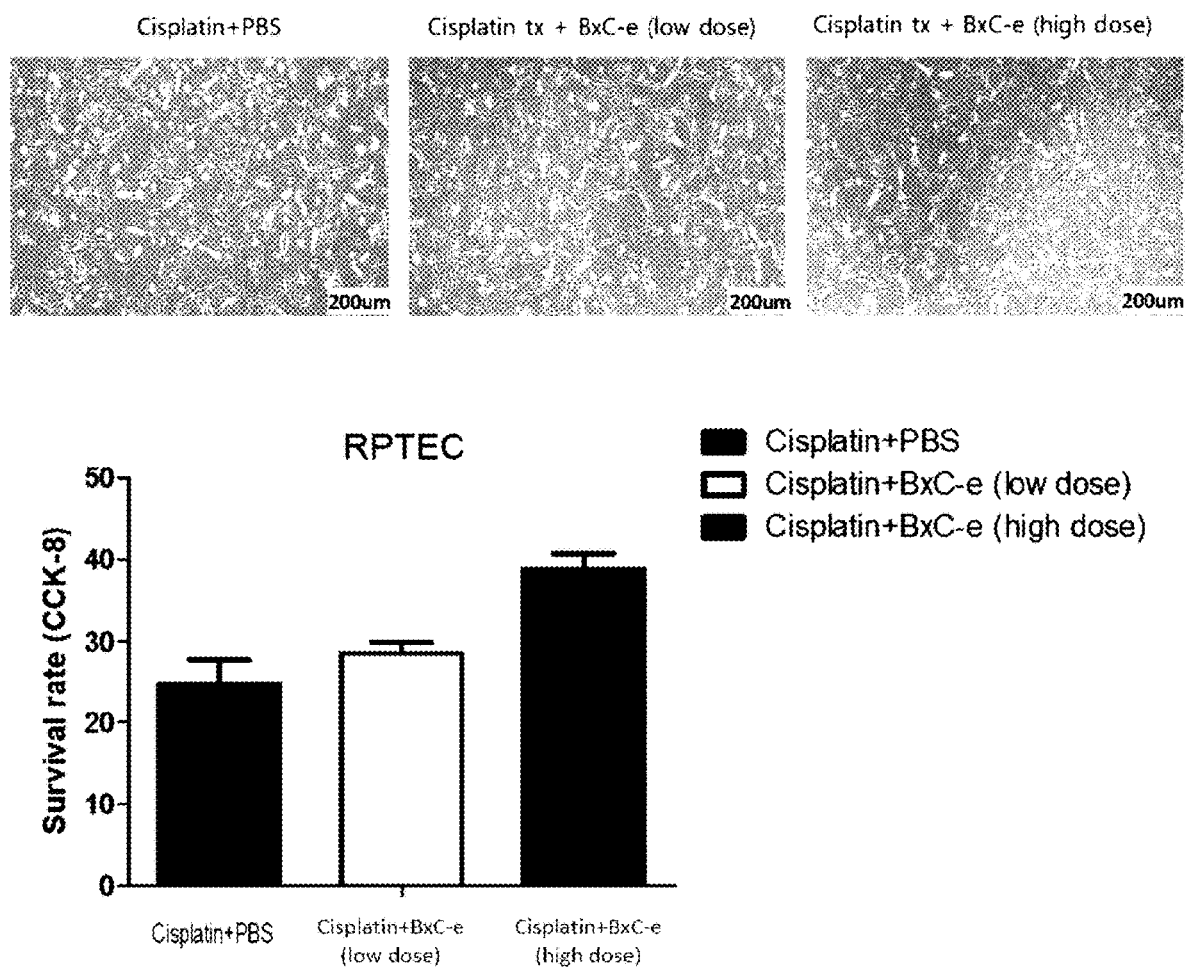
Figure 2C:
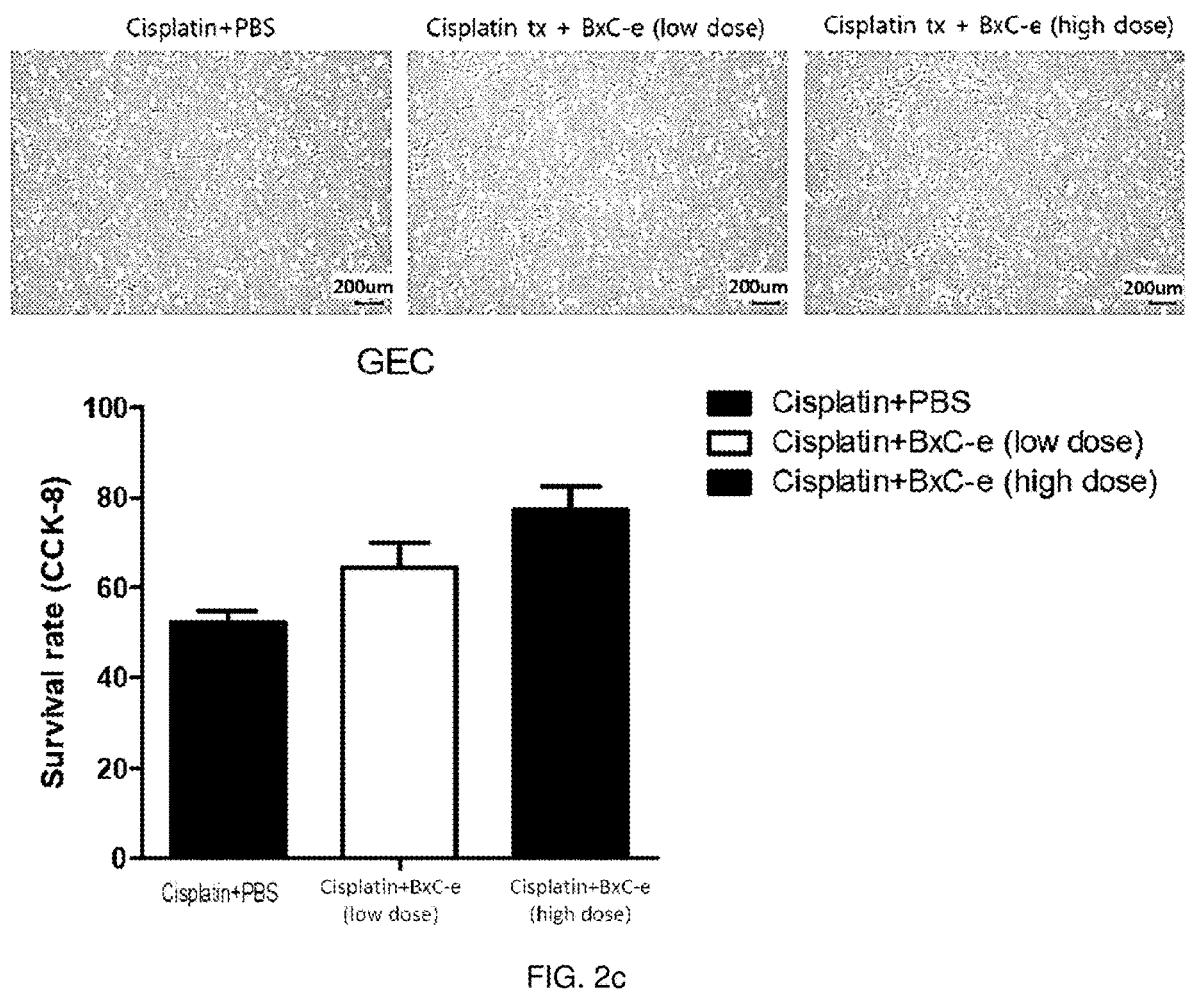

As can be seen in FIGS. 2a to 2c, the exosomes (BxC-e) isolated from BxC according to the present disclosure have an excellent regenerative effect on various renal cells.

Example 2: Isolation of Exosome (BxC-G63e) from iPSC-Derived MSC Progenitor Cell According to Treatment with Pretreatment Material 2-1. Isolation of Exosomes (BxC-G63e) from iPSC-Derived MSC Progenitor Cell Treated with Exendin-4

The iPSC-derived MSC progenitor cells (BxC) prepared in the Preparation Example were cultured for 24 hours in a culture medium [high glucose DMEM (Gibco, Cat no. 11995-065); 10% Fetal bovine Serum (HyClone), 1% MEM Non-Essential Amino Acids Solution (100×) (Gibco, Cat no. 11140-050)] containing 20 nM exendin-4.

After completion of incubation, the exendin-4-pretreated BxC was washed and additionally cultured for 72 hours in a medium supplemented with exosome-depleted 10% fetal bovine serum (FBS). The reason why exosome-depleted FBS was used in the cell culture medium is to prevent the incorporation of FBS-derived exosomes except for exosomes secreted by stem cells since the ordinarily used FBS contains a large amount of exosomes.

After 72 hours of incubation, the BxC culture medium treated with the pretreatment material was collected and centrifuged at 300×g for 10 min to remove remaining cells and cell debris as a pellet. The supernatant was taken and filtered through a 0.22-μm filter, followed by centrifugation at 10,000×g and 4° C. for 70 min in a high-speed centrifuge. The supernatant thus formed was subjected to ultracentrifugation at 100,000×g and 4° C. for 90 min. Exosomes were obtained as a pellet, diluted in PBS (phosphate buffered saline), and used in subsequent experiments.

2-2. Isolation of Exosomes (BxC-V37e) from iPSC-Derived MSC Progenitor Cell Treated with Lanifibranor The iPSC-derived MSC progenitor cells (BxC) prepared in the Preparation Example were cultured for 24 hours in a culture medium [high glucose DMEM (Gibco, Cat no. 11995-065); 10% Fetal bovine Serum (HyClone), 1% MEM Non-Essential Amino Acids Solution (100×) (Gibco, Cat no. 11140-050)] containing 10 μM lanifibranor.

After completion of incubation, the lanifibranor-pretreated BxC was washed and additionally cultured for 72 hours in a medium supplemented with exosome-depleted 10% fetal bovine serum (FBS).

After 72 hours of incubation, the BxC culture medium treated with the pretreatment material was collected and centrifuged at 300×g for 10 min to remove remaining cells and cell debris as a pellet. The supernatant was taken and filtered through a 0.22-μm filter, followed by centrifugation at 10,000×g and 4° C. for 70 min in a high-speed centrifuge. The supernatant thus formed was subjected to ultracentrifugation at 100,000×g and 4° C. for 90 min. Exosomes were obtained as a pellet, diluted in PBS (phosphate buffered saline), and used in subsequent experiments.

Experimental Example 3: Characterization of Exosome Isolated from iPSC-Derived MSC Progenitor Cell Treated with Pretreatment Material The exosomes isolated in Example 2 (BxC-G63e, BxC-V37e) were measured for size distribution by nanoparticle tracking assay (NanoSight NS300, Malvern) and morphologically identified using an electron microscope.

Figure 3A:
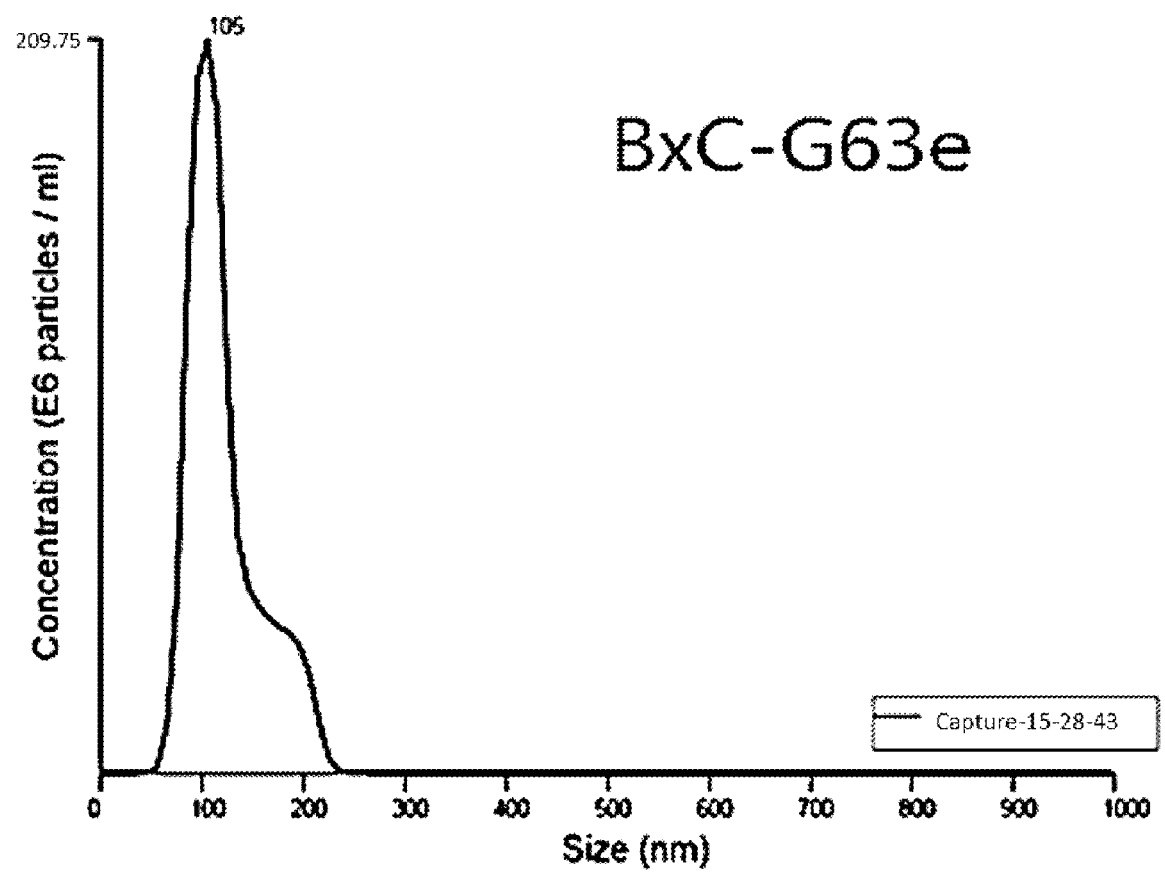
FIG. 3a is a plot of the mean size and distribution of exosomes (BxC-G63e) isolated from iPSC-derived MSC progenitor cells (BxC) pretreated with exendin-4.
Figure 3B:
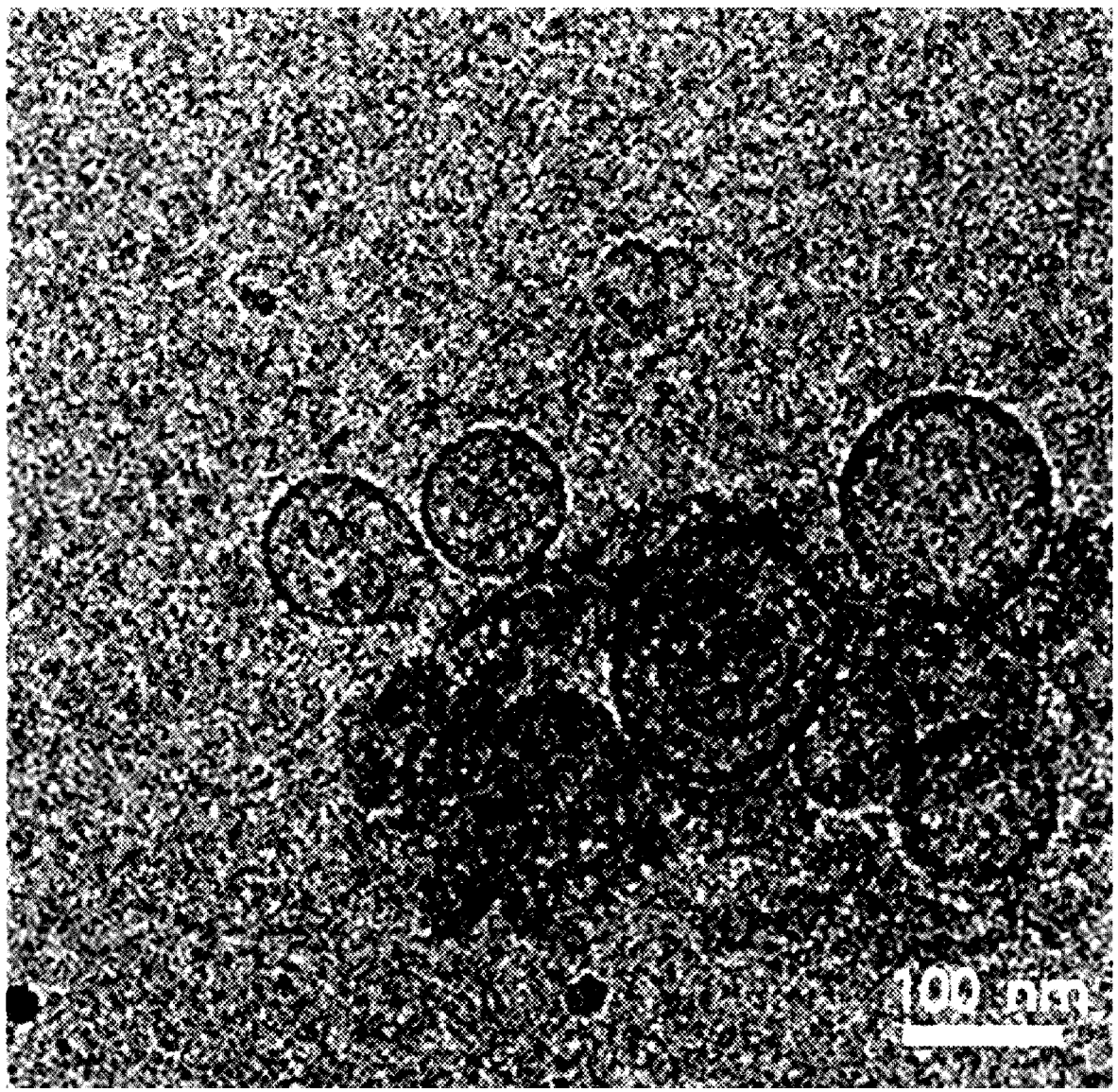
FIG. 3b is an electron microscope image of exosomes (BxC-G63e) isolated from iPSC-derived MSC progenitor cells (BxC) pretreated with exendin-4.
Figure 3C:
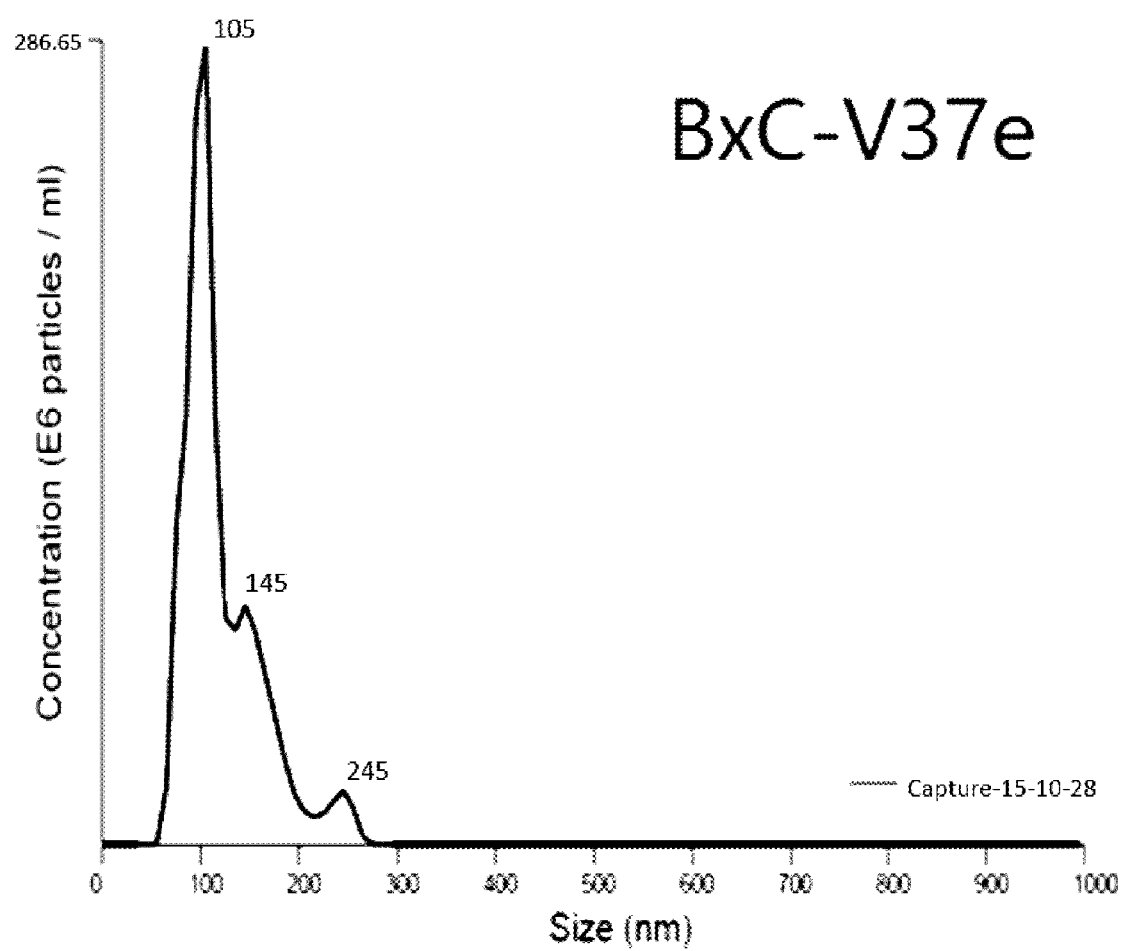
FIG. 3c is a plot of the mean size and distribution of exosomes (BxC-V37e) isolated from iPSC-derived MSC progenitor cells (BxC) pretreated with lanifibranor.
Figure 3D:
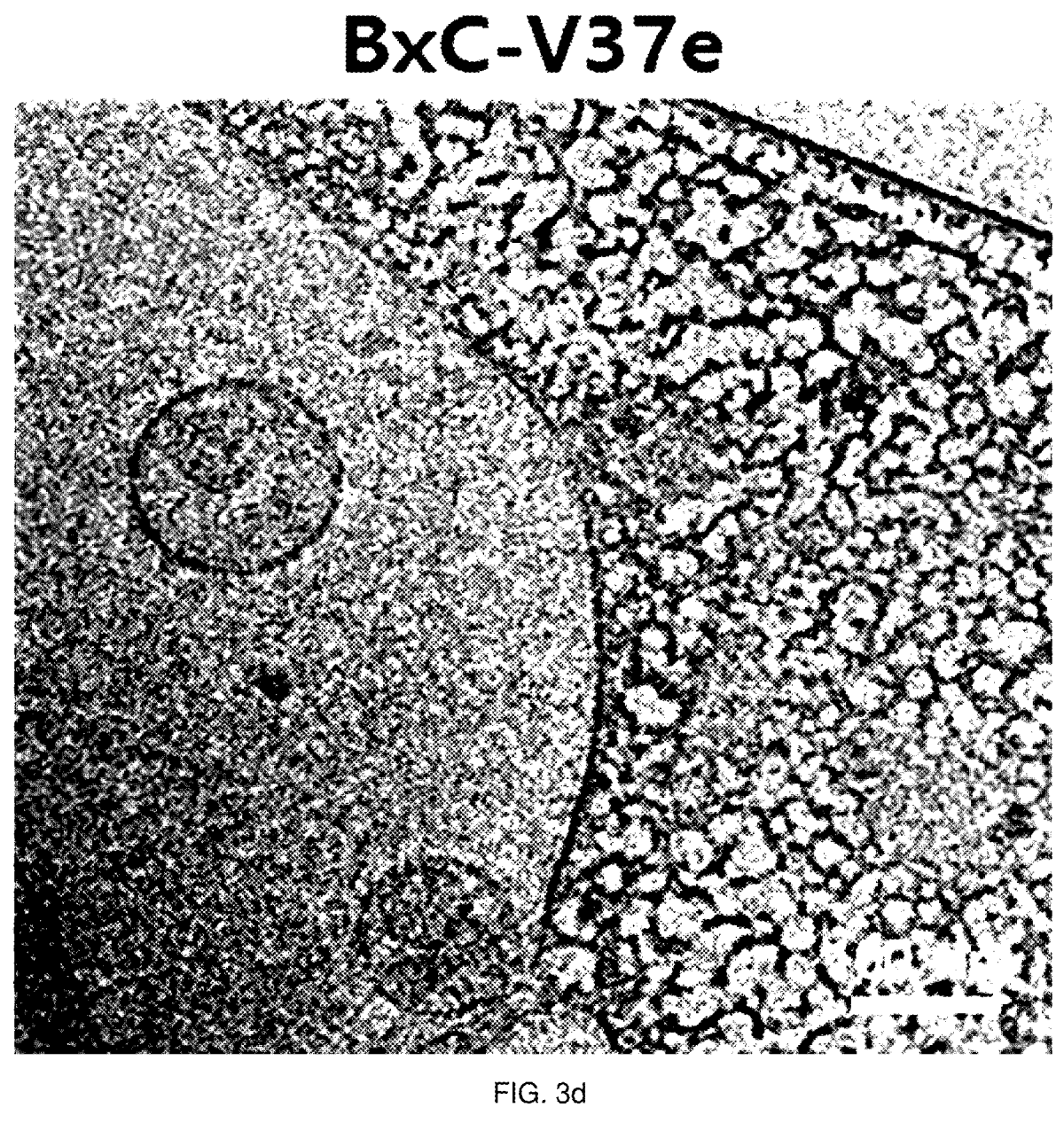

As shown in FIGS. 3a and 3d, the exosomes from BxC treated with exendin-4 or lanifibranor were observed to retain the trait of exosomes themselves.

Experimental Example 4: Assay for Therapeutic Activity of Exosome (BxC-G63e) Isolated from iPSC-Derived MSC Progenitor Cell Treated with Exendin-4 for Kidney Disease Exosomes isolated in Example 1 (BxC-e) and Example 2-1 (BxC-G63e) were assayed as follows.

4-1. Inflammation-Inhibiting Effect

The epithelial cell line HK-2 (Korean Cell Line Bank) and the kidney epithelial cells RPTEC and GEC were each seeded at a density of 1×10⁵ cells/well into 6-well culture dishes. At 16 hours after cell seeding, the cells were checked for the state thereof and treated for 24 hours with 25 μM cisplatin or 20 μg/mL LPS and 100 μg of the exosomes (BxC-e) isolated in Example 1 or the exosomes (BxC-G63e) isolated in Example 2. As a positive control, a group in which kidney failure had been induced by treatment with cisplatin or LPS alone was used.

After 24 hours, the supernatant was discarded and the cells were washed with DPBS and treated with Trizol to isolate total RNA. From the RNA, cDNA was synthesized, followed by qRT-PCR assay for TNFα gene expression.

Figure 4A:
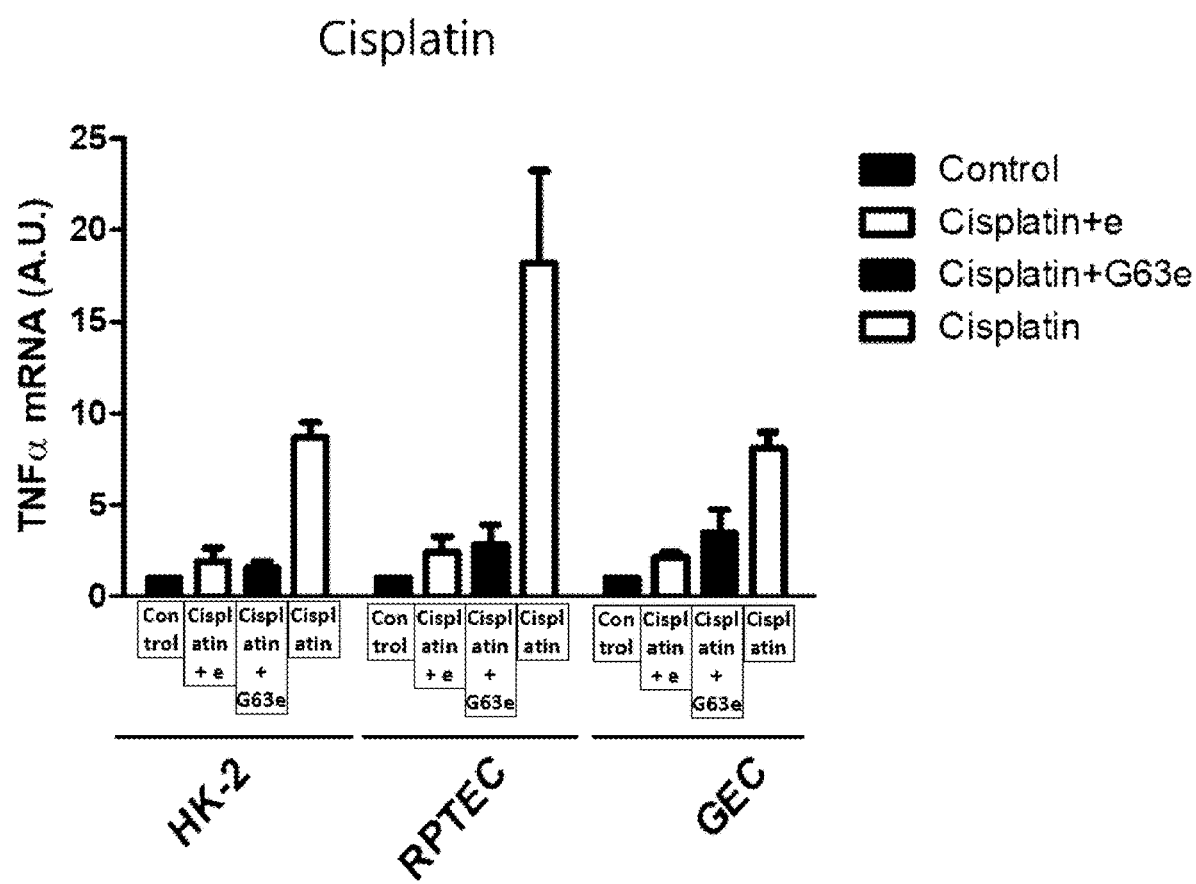
FIGS. 4a and 4b are graphs elucidating inflammation-inhibiting effects of exosomes (BxC-e) isolated from iPSC-derived MSC progenitor cells (BxC) and exosomes (BxC-G63e) isolated from iPSC-derived MSC progenitor cells (BxC) pretreated with exendin-4 in various kidney failure-induced renal cells.
Figure 4B:
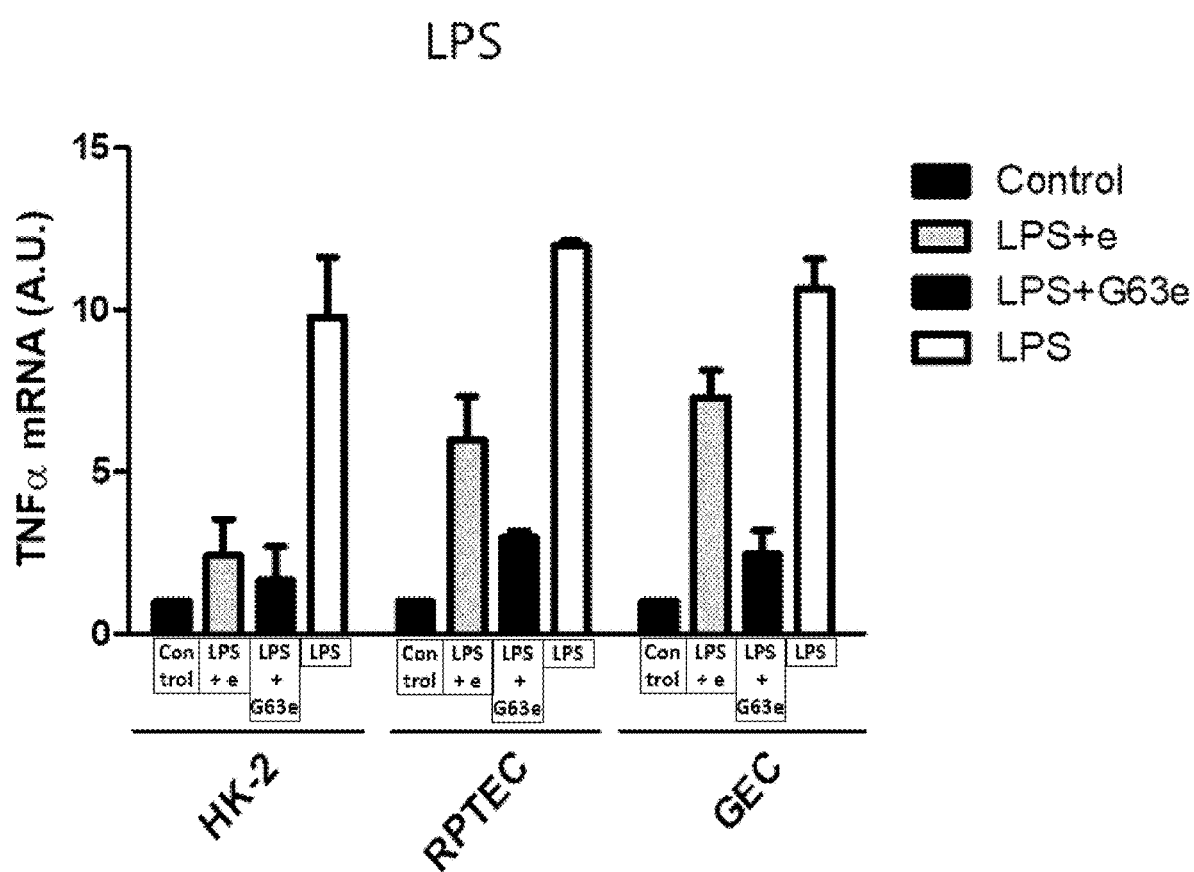

As can be seen in FIGS. 4a and 4b, the exosomes (BxC-e and BxC-G63e) of the present disclosure exhibited an effect of remarkably inhibiting inflammation in various renal cells in which toxicity had been caused by treatment with cisplatin or LPS.

4-2. Apoptosis-Inhibiting Effect

The epithelial cell line HK-2 (Korean Cell Line Bank) and the kidney epithelial cells RPTEC and GEC were each seeded at a density of 1×10⁵ cells/well into 6-well culture dishes. At 16 hours after cell seeding, the cells were checked for the state thereof and treated for 24 hours with 25 μM cisplatin or 20 μg/mL LPS and 100 μg of the exosomes (BxC-e) isolated in Example 1 or the exosomes (BxC-G63e) isolated in Example 2. As a positive control, a group in which kidney failure had been induced by treatment with cisplatin or LPS alone was used.

After 24 hours, the supernatant was discarded and the cells were washed with DPBS and treated with Trizol to isolate total RNA. From the RNA, cDNA was synthesized, followed by qRT-PCR assay for caspase-3 gene expression.

Figure 5A:
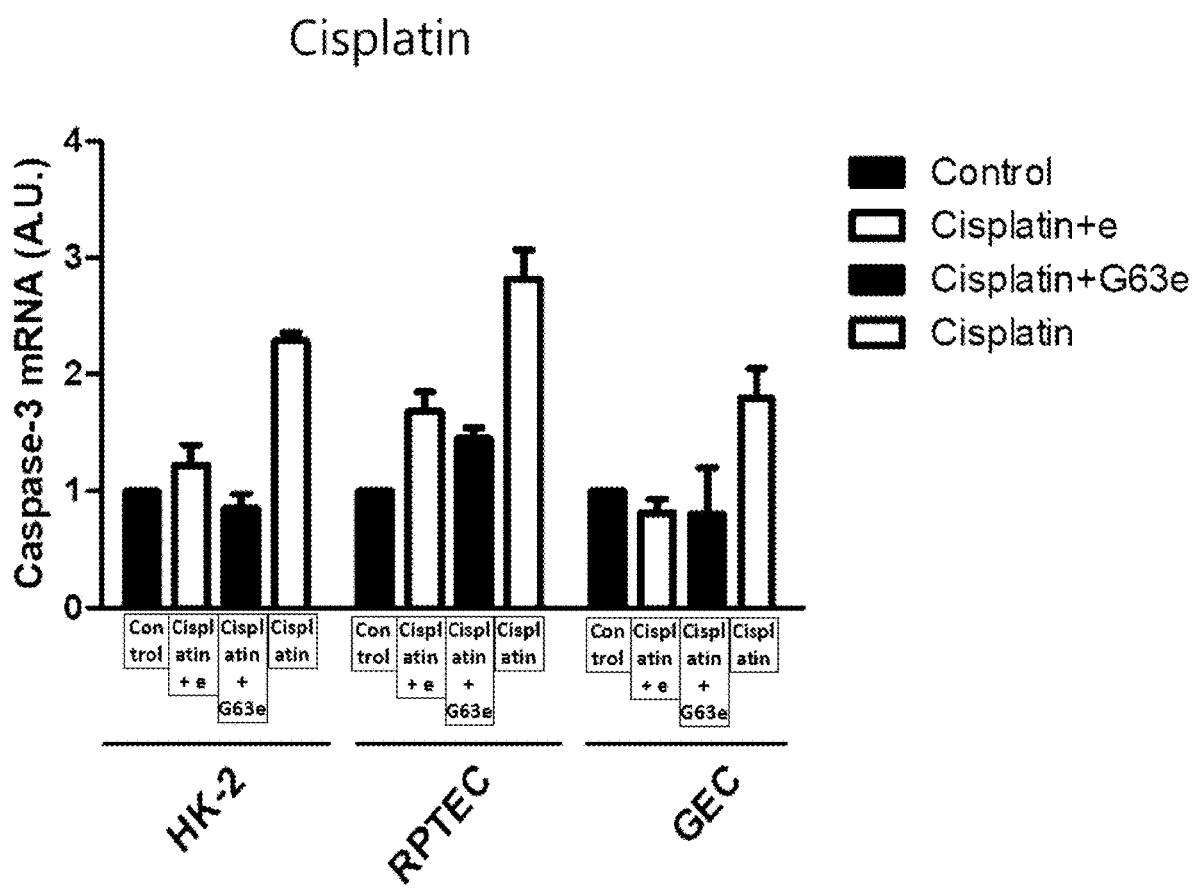
FIGS. 5a and 5b are graphs elucidating apoptosis-inhibiting effects of exosomes (BxC-e) isolated from iPSC-derived MSC progenitor cells (BxC) and exosomes (BxC-G63e) isolated from iPSC-derived MSC progenitor cells (BxC) pretreated with exendin-4 in various kidney failure-induced renal cells.
Figure 5B:
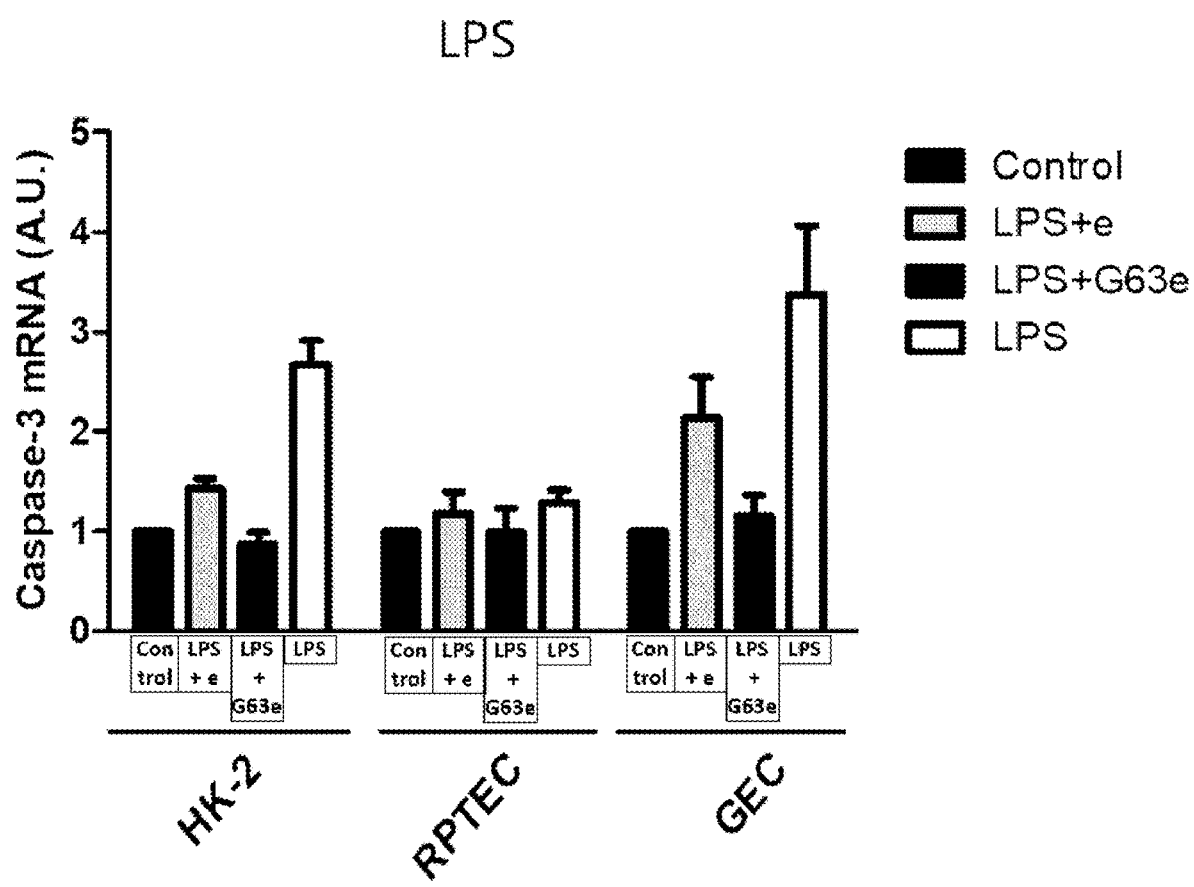

As can be seen in FIGS. 5a and 5b, the exosomes (BxC-e and BxC-G63e) of the present disclosure exhibited an effect of remarkably inhibiting apoptosis in various renal cells in which toxicity had been caused by treatment with cisplatin or LPS.

4-3. ER Stress-Inhibiting Effect

The epithelial cell line HK-2 (Korean Cell Line Bank) and the kidney epithelial cells RPTEC and GEC were each seeded at a density of 1×10⁵ cells/well into 6-well culture dishes. At 16 hours after cell seeding, the cells were checked for the state thereof and treated for 24 hours with 25 μM cisplatin or 20 μg/mL LPS and 100 μg of the exosomes (BxC-e) isolated in Example 1 or the exosomes (BxC-G63e) isolated in Example 2. As a positive control, a group in which kidney failure had been induced by treatment with cisplatin or LPS alone was used.

After 24 hours, the supernatant was discarded and the cells were washed with DPBS and treated with Trizol to isolate total RNA. From the RNA, cDNA was synthesized, followed by qRT-PCR assay for CHOP gene expression.

Figure 6A:
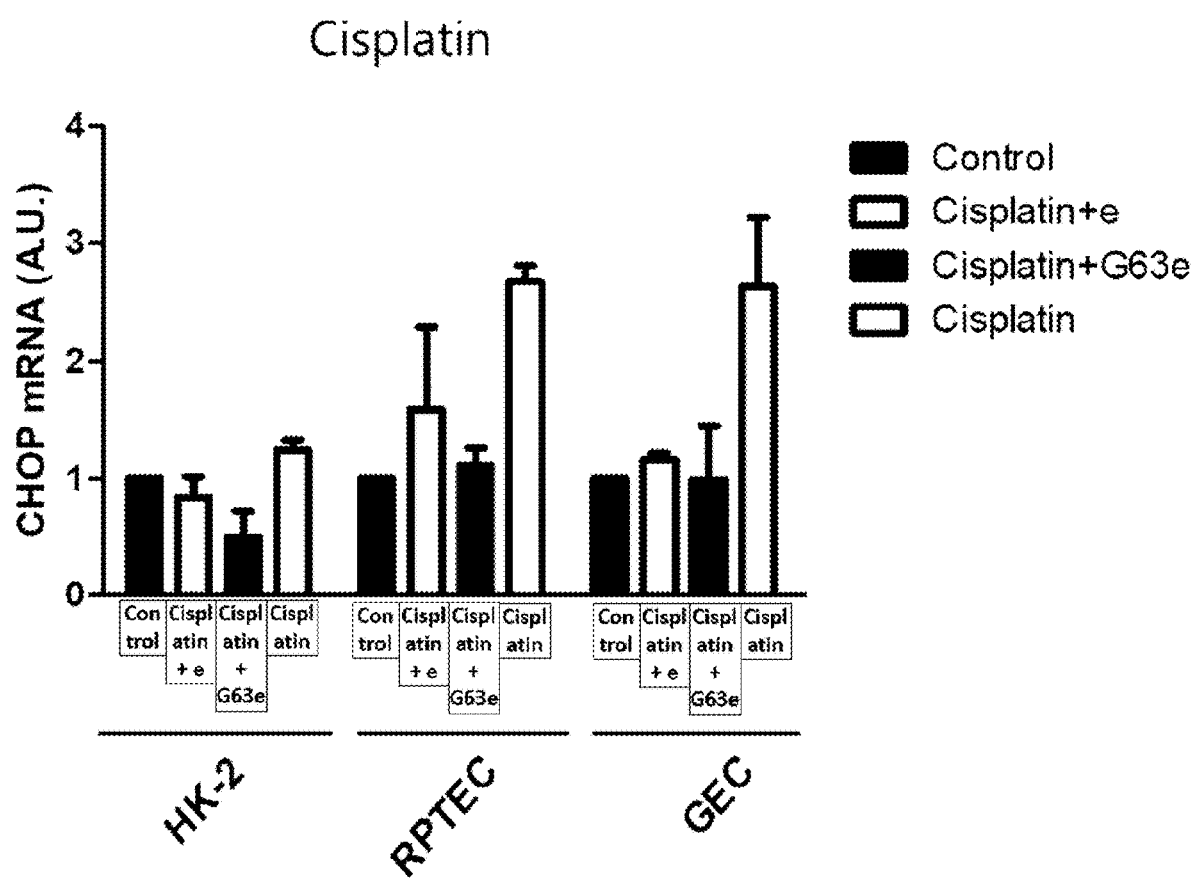
FIGS. 6a and 6b are graphs elucidating ER stress-inhibiting effects of exosomes (BxC-e) isolated from iPSC-derived MSC progenitor cells (BxC) and exosomes (BxC-G63e) isolated from iPSC-derived MSC progenitor cells (BxC) pretreated with exendin-4 in various kidney failure-induced renal cells.
Figure 6B:
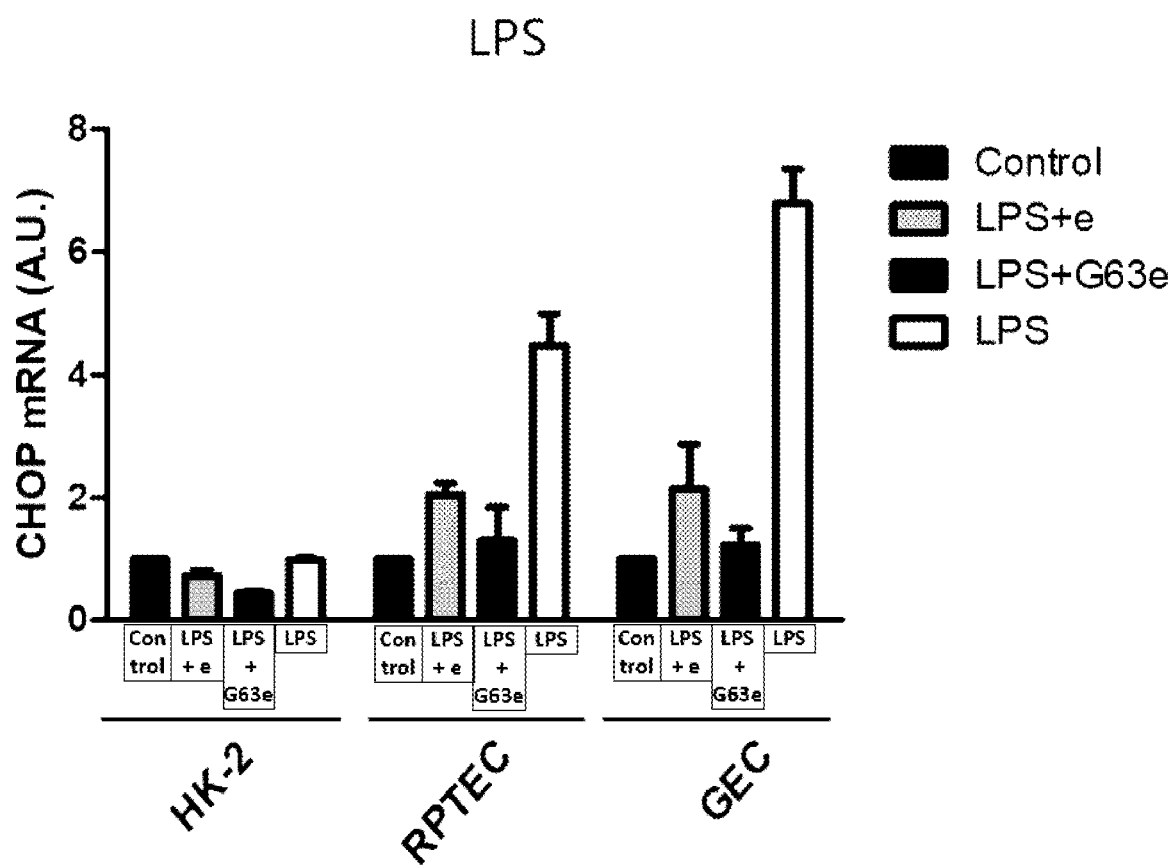

As can be seen in FIGS. 6a and 6b, the exosomes (BxC-e and BxC-G63e) of the present disclosure exhibited an effect of remarkably inhibiting endoplasmic reticulum stress in various renal cells in which toxicity had been caused by treatment with cisplatin or LPS.

4.4 Function of Treating and Recovering from Renal Damage

The exosomes (BxC-G63e) isolated from iPSC-derived MSC progenitor cells pretreated with exendin-4 were examined for the function to treat and recover from renal damage in a mouse renal damage model in which kidney failure had been induced by cisplatin.

Cisplatin (15 mg/kg) was injected intraperitoneally into Balb/c male mice 8 weeks old to induce renal damage. After injection of cisplatin, the exosomes (BxC-G63e) isolated from iPSC-derived MSC progenitor cells treated with exendin-4 were administered IV. Three days later, a blood sample was taken and measured for creatinine and BUN levels to determine the ability of BxC-G63e to treat and recover from renal damage.

TABLE 1

|  | Normal control | No treatment | BxC-G63e |
|---|---|---|---|
| BUN level (mg/dL) | 21.2 | 316 | 157 |

TABLE 2

|  | Normal control | No treatment | BxC-G63e |
|---|---|---|---|
| Creatinine level (mg/dL) | 0.1 | 1.5 | 0.9 |

Figure 7A:
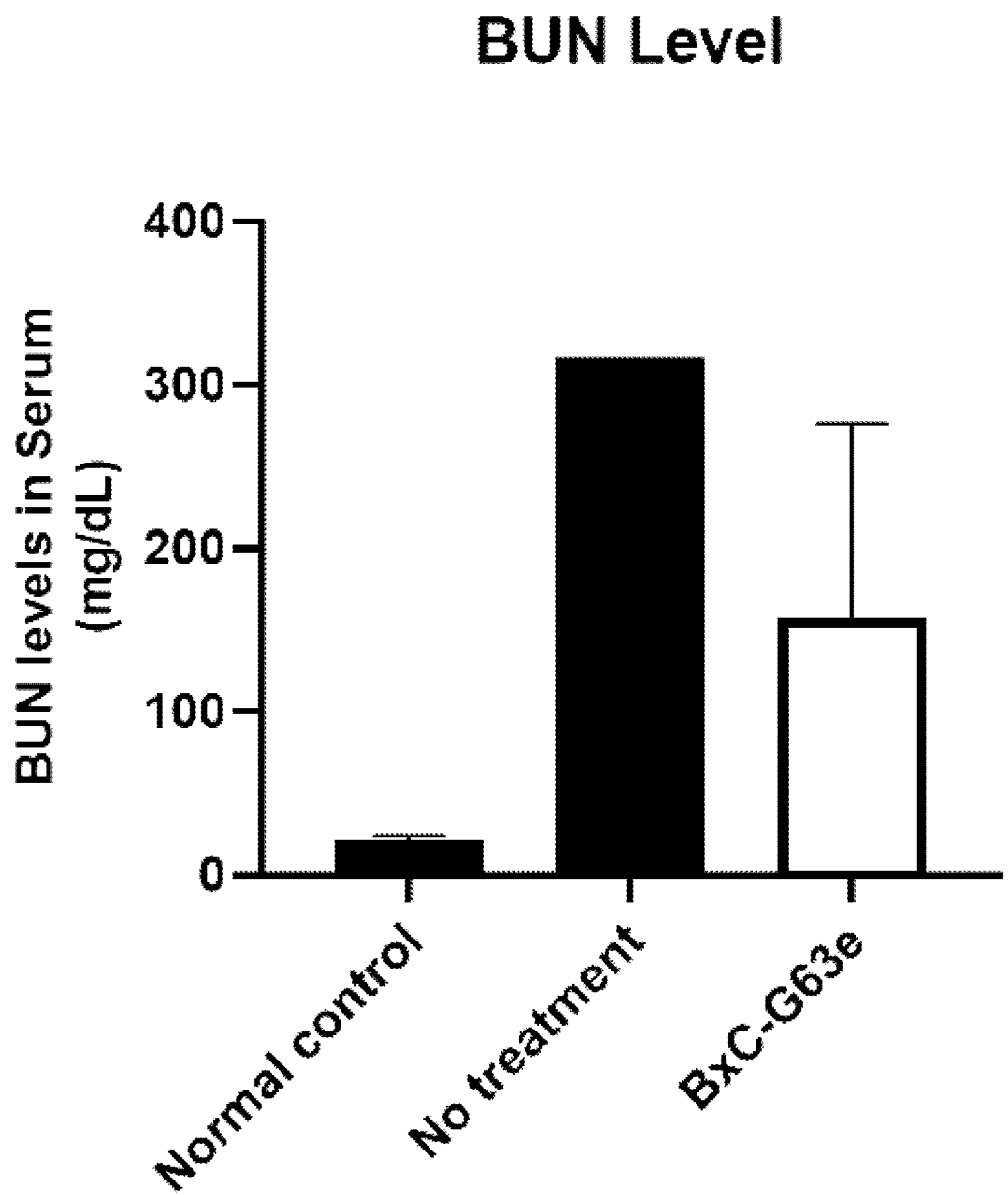
FIGS. 7a and 7b are graphs demonstrating that exosomes (BxC-G63e) isolated from iPSC-derived MSC progenitor cells (BxC) pretreated with exendin-4 have the function of treating and recovering from renal damage in kidney failure-induced renal cells.
Figure 7B:
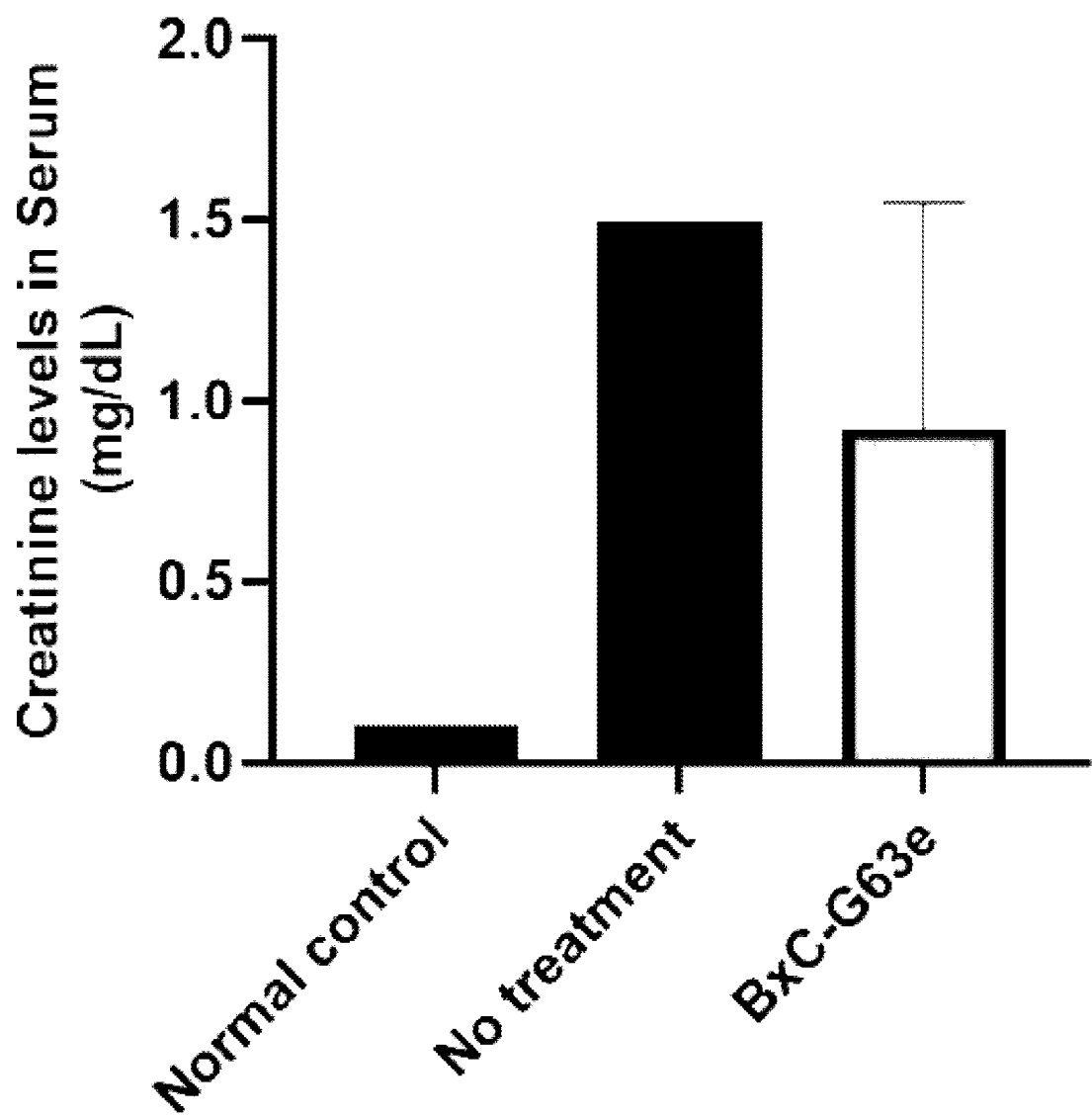

As is understood therefrom, the data of FIGS. 7a and 7b and Tables 1 and 2 show the ability of the exosomes (BxC-G63e) isolated from iPSC-derived MSC progenitor cells pretreated with exendin-4 to remarkably reduce the levels of blood urea nitrogen and creatinine in the kidney, demonstrating that the BxC-G63e exosomes have an excellent effect of recovering the renal function from a damage state.

Experimental Example 5: Assay for Therapeutic Activity of Exosome (BxC-V37e) Isolated from iPSC-Derived MSC Progenitor Cell Treated with Lanifibranor for Kidney Disease 5.1. Apoptosis-Inhibiting Effect Kidney epithelial cells were seeded at a density of 1×10⁵ cells/well into 6-well culture dishes. At 16 hours after cell seeding, the cells were checked for the state thereof and treated for 24 hours with TGF-β (10 ng/mL), together with 100 μg of the exosomes (BxC-e) isolated in Example 1 or the exosomes (BxC-V37e) isolated from iPSC-derived MSC progenitor cells treated with lanifibranor, in a serum-free growth medium. As a positive control, a group in which kidney failure had been induced by treatment with cisplatin or TGF-β alone was used.

After 24 hours, the supernatant was discarded and the cells were washed with DPBS and treated with Trizol to isolate total RNA. From the RNA, cDNA was synthesized using the primers of Table 3, below, followed by qRT-PCR assay for caspase-3 gene expression.

TABLE 3

| No. | Name | Sequence (5'→3') | Note |
|---|---|---|---|
| 1 | Human_Caspase-3_Foward | TCTGGTTTTCGGTGGGTGTG |  |

TABLE 3-continued

| No. | Name | Sequence (5'→3') | Note |
|---|---|---|---|
| 2 | Human_Caspase-3_Reverse | CGCTTCCATGTATGATCTTTGGTT | 5 |

TABLE 4

| | TGFβ− | TGFβ+ | TGFβ + e | TGFβ + V37e |
|---|---|---|---|---|
| Casepase-3 mRNA (A.U.) | 1.2 | 5.2 | 1.1 | 0.9 |

Figure 8:
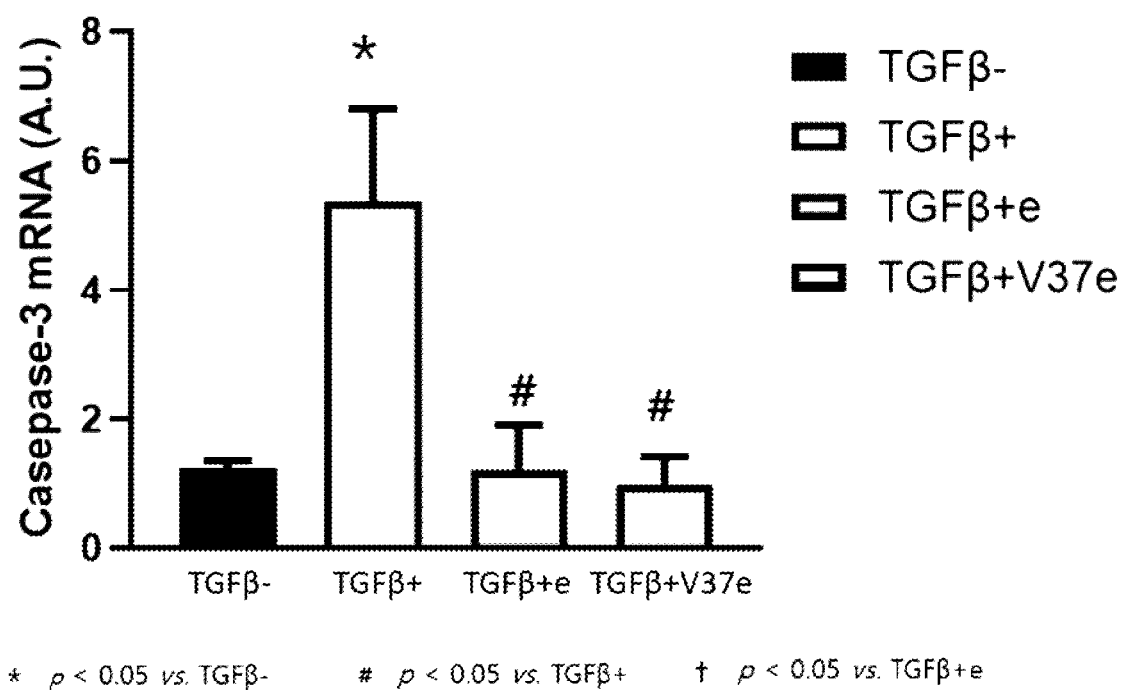
FIG. 8 is a graph elucidating apoptosis-inhibiting effects of exosomes (BxC-V37e) isolated from iPSC-derived MSC progenitor cells pretreated with lanifibranor in kidney failure-induced renal cells (wherein, *: $p<0.05$ vs. TGFβ−, #: $p<0.05$ vs. TGFβ+, and †: $p<0.05$ vs. TGFβ+e).
Figure 9A:
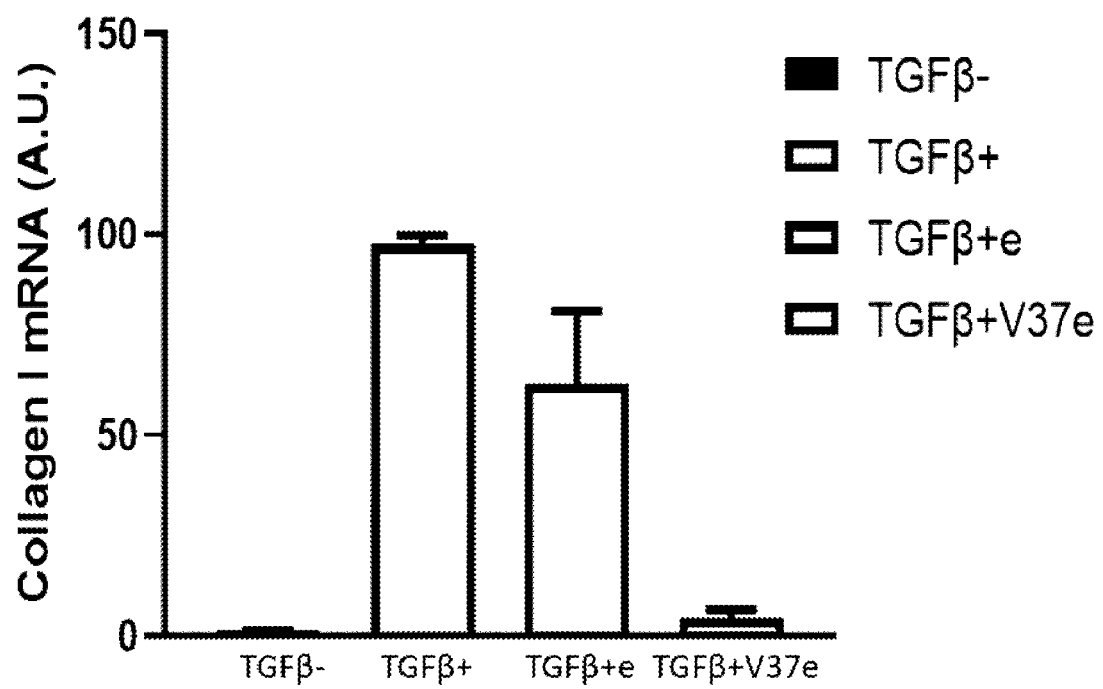
FIGS. 9a, 9b, 9c and 9d are graphs elucidating kidney fibrosis-inhibiting effects of exosomes (BxC-V37e) isolated from iPSC-derived MSC progenitor cells pretreated with lanifibranor as measured for inhibition against collagen I, CTGF, α-SMA, and fibronectin expression in kidney failure-induced renal cells (wherein, *: $p<0.05$ vs. TGFβ−, #: $p<0.05$ vs. TGFβ+, and †: $p<0.05$ vs. TGFβ+e).
Figure 9B:
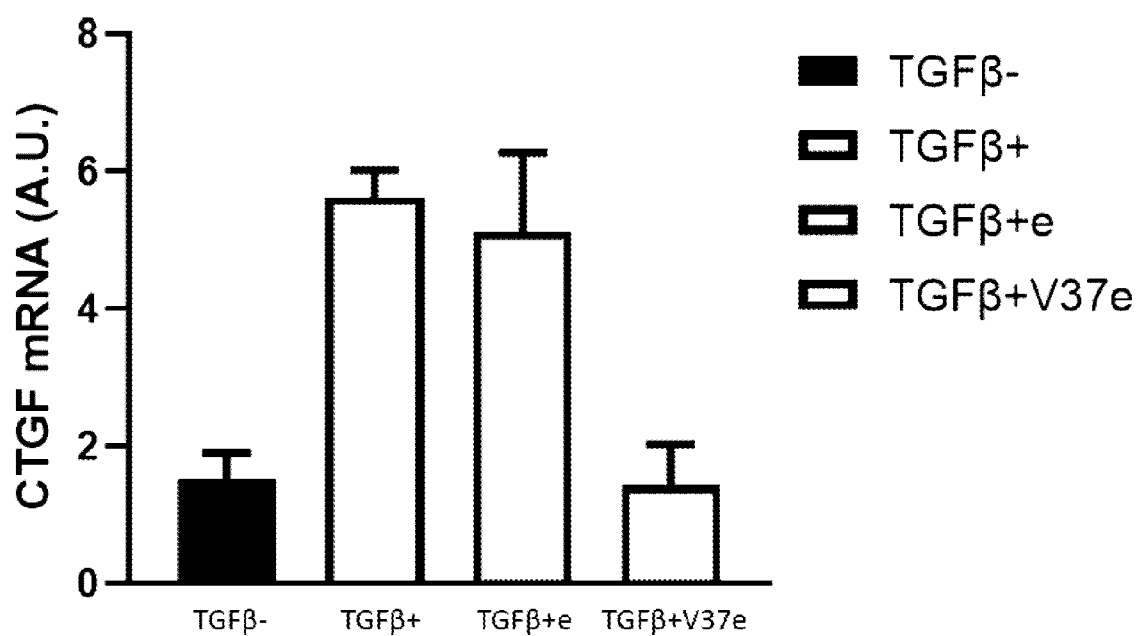
Figure 9C:
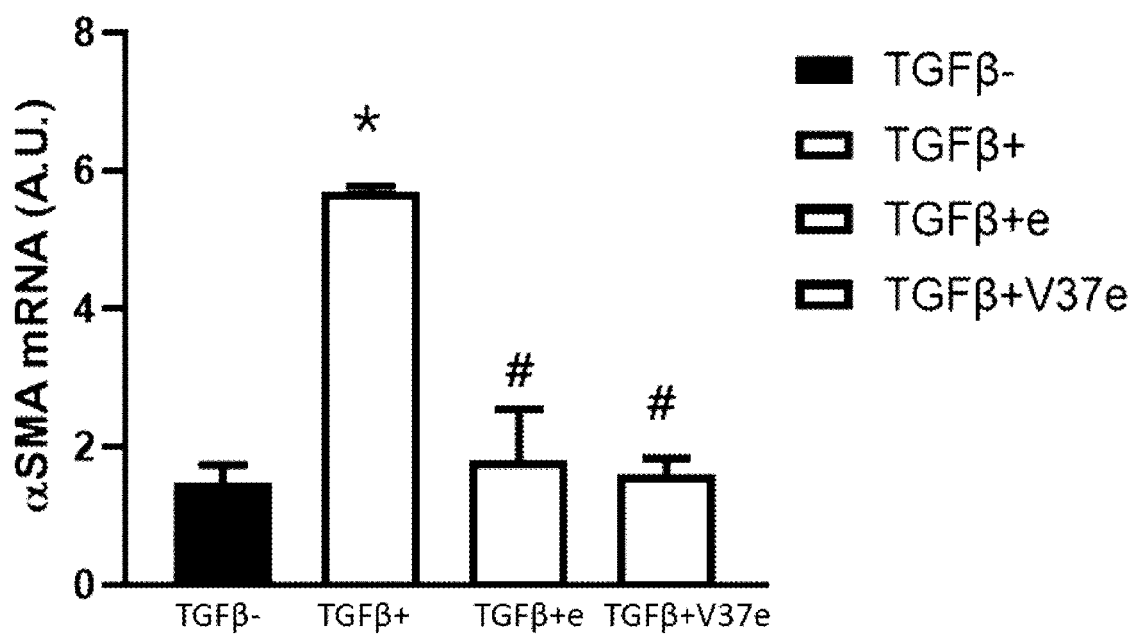
Figure 9D:
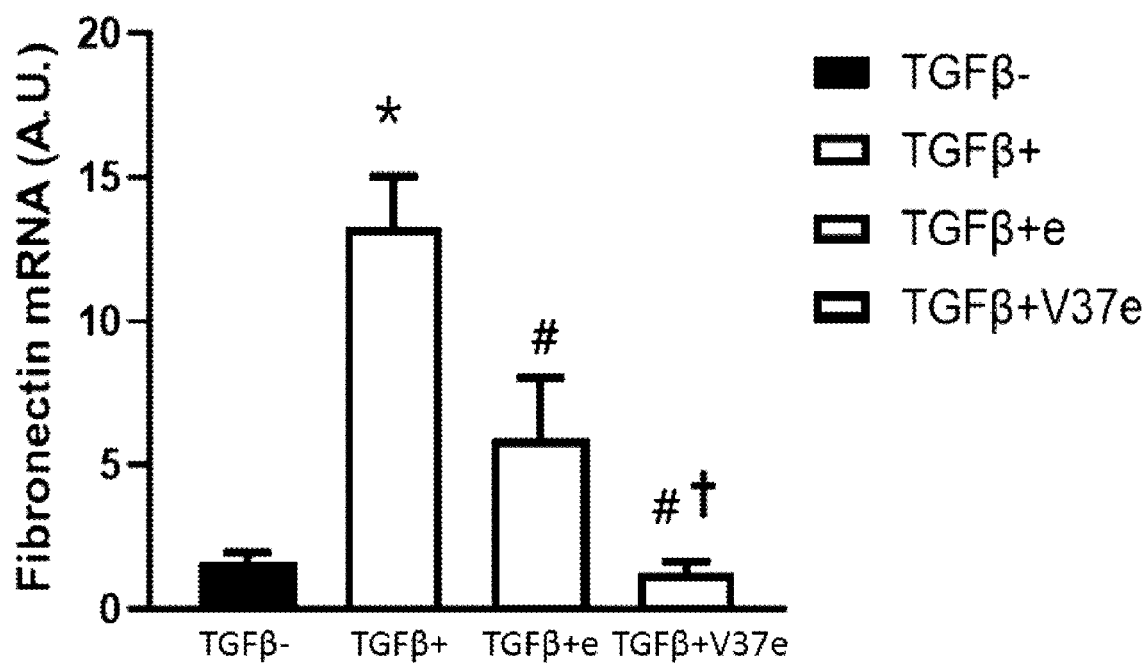
Figure 10A:
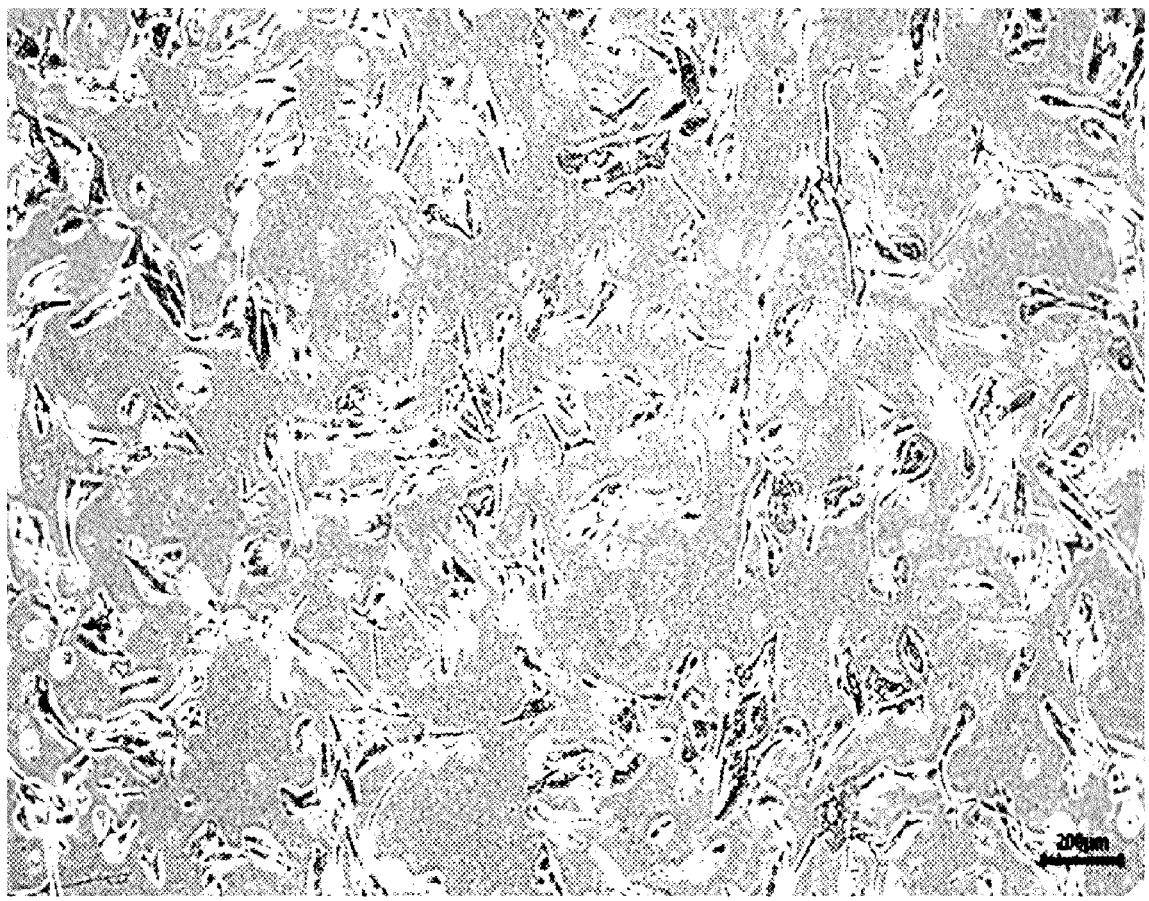
FIGS. 10a, 10b, 10c, 10d and 10e are images and a graph elucidating kidney fibrosis-inhibiting effects of exosomes (BxC-V37e) isolated from iPSC-derived MSC progenitor cells pretreated with lanifibranor as measured for inhibition against nodule formation in kidney failure-induced renal cells.
Figure 10B:
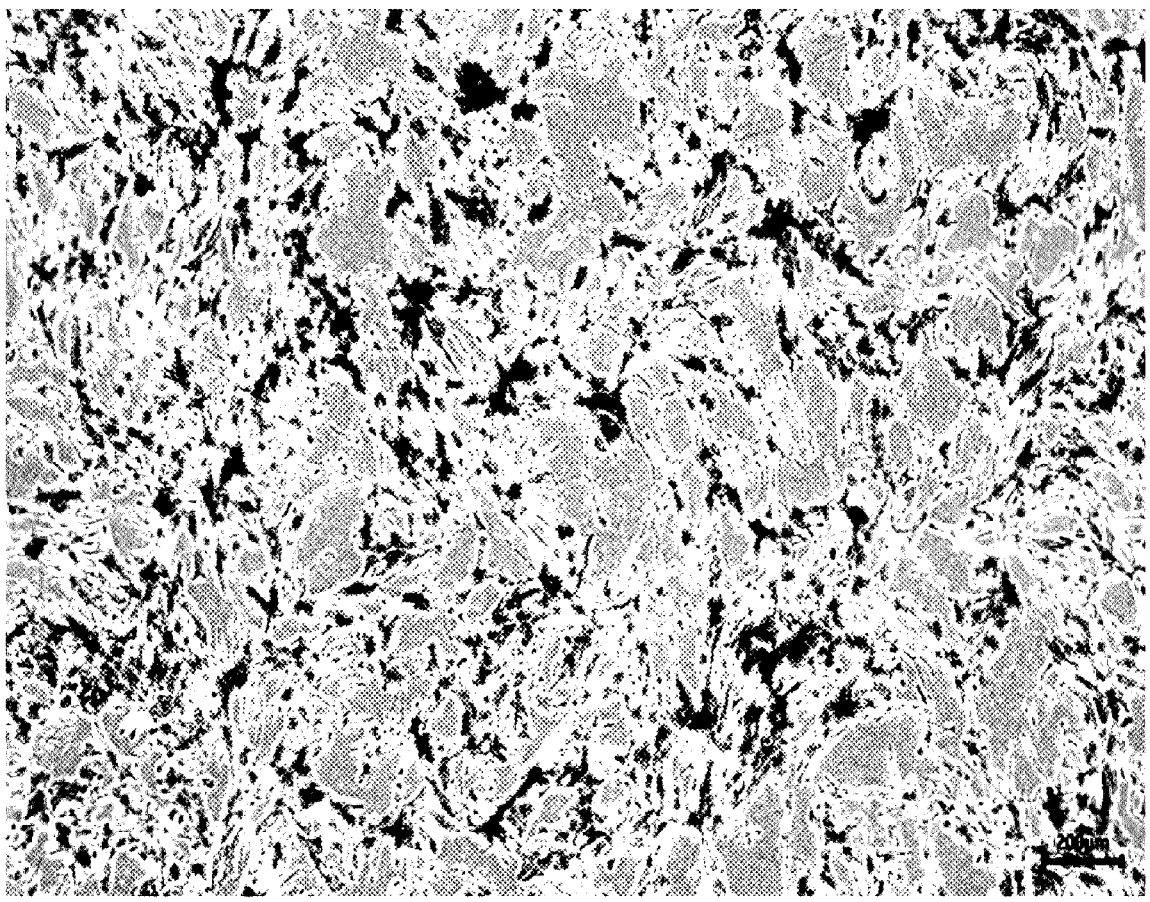
Figure 10C:
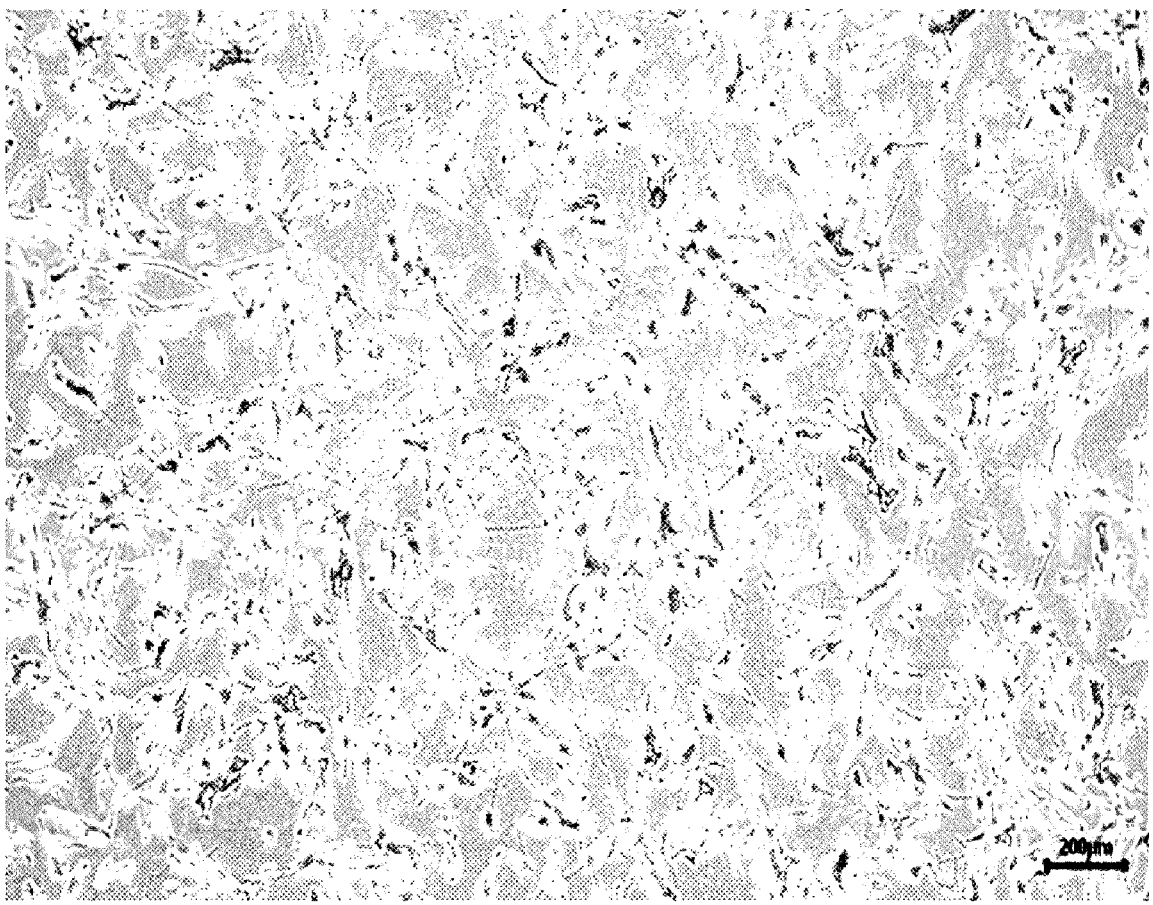
Figure 10D:
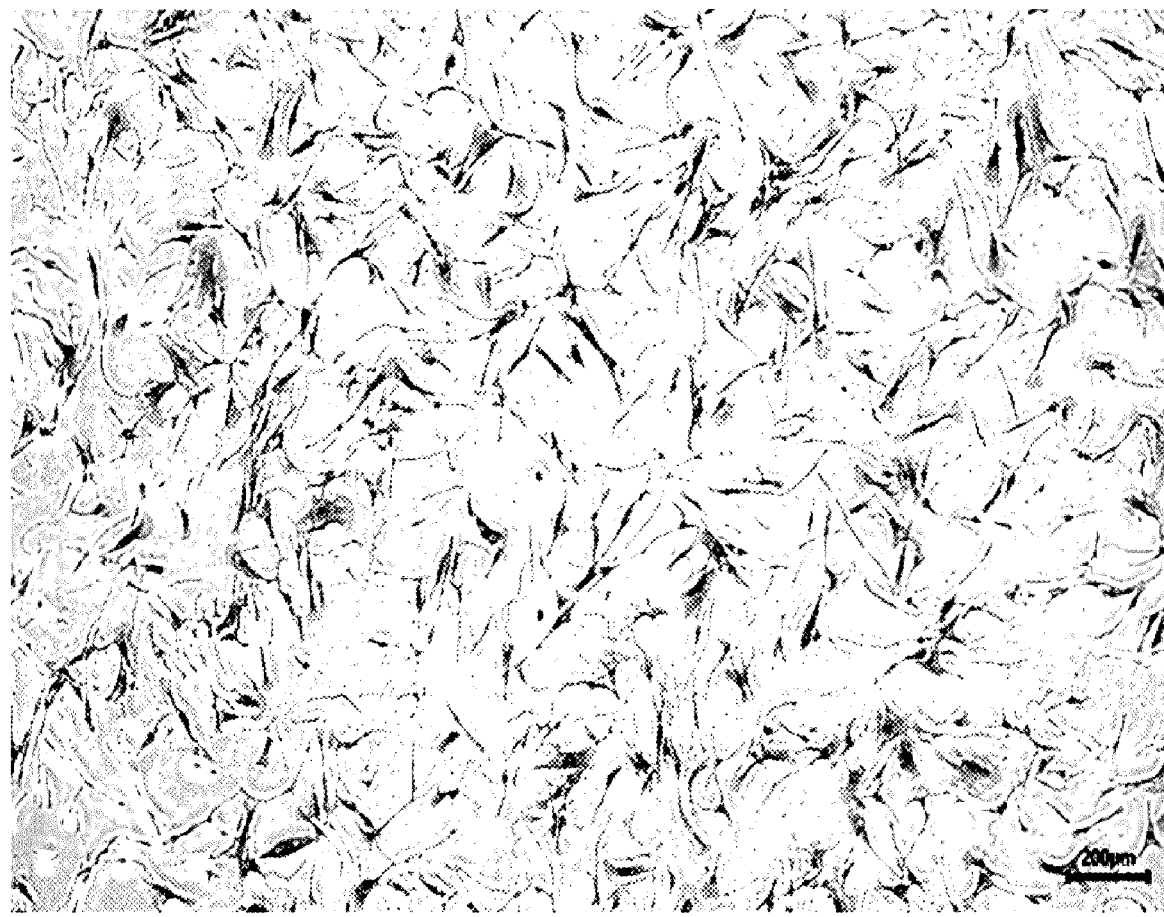
Figure 10E:
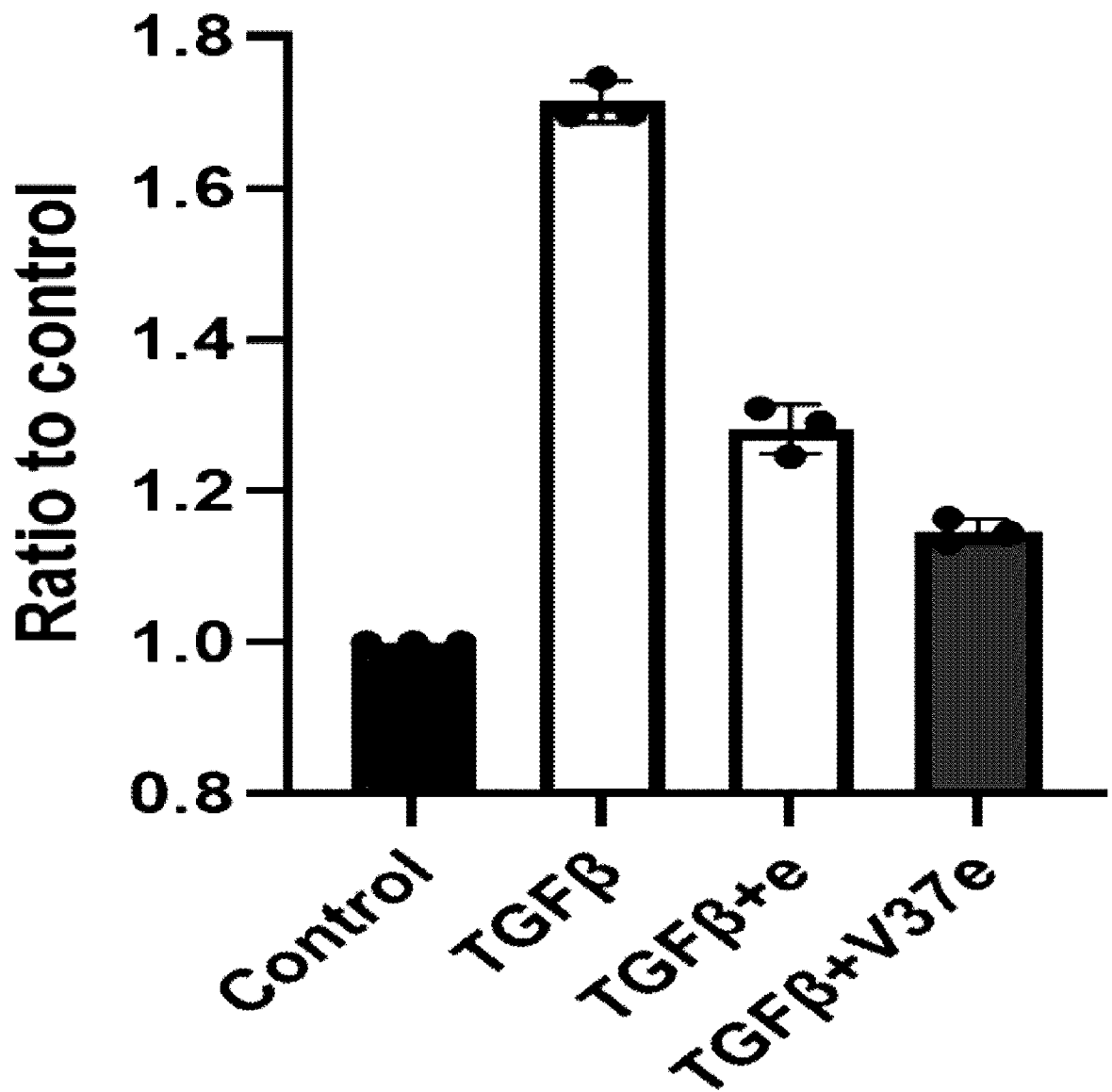

As can be seen in FIG. 8 and Table 4, the exosomes (BxC-e and BxC-V37e) of the present disclosure exhibited an effect of remarkably inhibiting apoptosis in renal cells in which fibrosis had been caused by treatment with TGF-β.

5.2. Fibrosis-Inhibiting Effect
5.2.1. Inhibition Against Expression of Collagen I, CTGF, α-SMA, and Fibronectin Kidney epithelial cells were seeded at a density of $1 \times 10^5$ cells/well into 6-well culture dishes. At 16 hours after cell seeding, the cells were checked for the state thereof and treated for 24 hours with TGF-β (10 ng/mL), together with 100 μg of the exosomes (BxC-e) isolated in Example 1 or the exosomes (BxC-V37e) isolated from iPSC-derived MSC progenitor cells treated with lanifibranor, in a serum-free growth medium. As a positive control, a group in which kidney failure had been induced by treatment with TGF-β alone was used.

After 24 hours, the supernatant was discarded and the cells were washed with DPBS and treated with Trizol to isolate total RNA. From the RNA, cDNA was synthesized, followed by qRT-PCR assay for collagen I, CTGF, α-SMA, and fibronectin gene expression.

TABLE 5

| No. | Name | Sequence (5'→3') | Note |
|---|---|---|---|
| 3 | Human_Collagen1_Foward | CACAGAGGTTTCAGTGGTTT | |
| 4 | Human_Collagen1_Reverse | GCACCAGTAGCACCATCATT | |
| 5 | Human_CTGF_Foward | CAAGGGCCTCTTCTGTGACT | |
| 6 | Human_CTGF_Reverse | ACGTGCACTGGTACTTGCAG | |
| 7 | Human_αSMA_Foward | AGGTAACGAGTCAGAGCTTTGGC | |
| 8 | Human_αSMA_Reverse | CTCTCTGTCCACCTTCCAGCAG | |
| 9 | Human_Fibronectin_Foward | AAGATTGGAGAGAAGTGGGACC | |
| 10 | Human_Fibronectin_Reverse | GAGCAAATGGCACCGAGATA | |

TABLE 6

| | TGFβ− | TGFβ+ | TGFβ + e | TGFβ + V37e |
|---|---|---|---|---|
| Collagen I mRNA (A.U.) | 1 | 98.2 | 63.8 | 4.2 |

TABLE 7

| | TGFβ− | TGFβ+ | TGFβ + e | TGFβ + V37e |
|---|---|---|---|---|
| CTGF mRNA (A.U.) | 1.8 | 5.7 | 5.2 | 1.7 |

TABLE 8

| | TGFβ− | TGFβ+ | TGFβ + e | TGFβ + V37e |
|---|---|---|---|---|
| α-SMA mRNA (A.U.) | 1.7 | 5.8 | 1.9 | 1.7 |

TABLE 9

| | TGFβ− | TGFβ+ | TGFβ + e | TGFβ + V37e |
|---|---|---|---|---|
| Fibronectin mRNA (A.U.) | 1.4 | 13.6 | 6.7 | 1.2 |

As can be seen in FIGS. 9a to 9d and Tables 6 to 9, the exosomes (BxC-e and BxC-V37e) of the present disclosure were found to remarkably reduce expression of the fibrosis-related genes Collagen I, CTGF, α-SMA, and Fibronectin genes in renal cells in which kidney failure had been induced by treatment with TGF-β.

5.2.2. Inhibition of Nodule Formation

Kidney epithelial cells were seeded at a density of 1×10$^5$ cells/well into 6-well culture dishes. Upon cell seeding, the cells were checked for the state thereof and treated for 24 hours with TGF-β (10 ng/mL), together with 100 μg of the exosomes (BxC-e) isolated in Example 1 or the exosomes (BxC-V37e) isolated from iPSC-derived MSC progenitor cells treated with lanifibranor in a serum-free growth medium. As a positive control, a group in which kidney failure had been induced by treatment with TGF-β alone was used. After 24 hours, the supernatant was discarded and the cells were washed with DPBS. After fixation with methanol for 5 min at 4° C., the cells were treated with a picrosirius red solution and washed twice with an acetic acid solution (0.5%). The formation of nodules was observed under a microscope. The Picrosirius Red dye was dissolved with 0.1 N KOH and absorbance at 540 nm was read and compared to the positive control.

TABLE 10

|  | TGFβ− | TGFβ+ | TGFβ + e | TGFβ + v37e |
|---|---|---|---|---|
| Ratio to control | 1 | 1.71 | 1.28 | 1.14 |

As can be seen in FIGS. 10a to 10e and Table 10, the exosomes (BxC-e and BxC-V37e) of the present disclosure were found to remarkably reduce the generation of nodules formed in the renal cells in which kidney failure had been induced by treatment with TGFβ.

5.2.3. Prevention of Smad2 Phosphorylation

Kidney epithelial cells were seeded at a density of 1×10$^5$ cells/well into 6-well culture dishes. At 16 hours after cell seeding, the cells were checked for the state thereof and treated for 24 hours with TGF-β (10 ng/mL), together with 100 μg of the exosomes (BxC-e) isolated in Example 1 or the exosomes (BxC-V37e) isolated from iPSC-derived MSC progenitor cells treated with lanifibranor, in a serum-free growth medium. As a positive control, a group in which kidney failure had been induced by treatment with TGF-β alone was used.

After 24 hours, the supernatant was discarded and the cells were washed with DPBS. The cells were harvested and subjected to protein extraction with an NP40 buffer. The proteins were analyzed for total Smad2 protein and phosphorylated protein levels by western blotting. Phosphorylated Smad2 proteins were quantitatively analyzed relative to individual total proteins and compared to a negative control treated without TGF-β.

Figure 11:
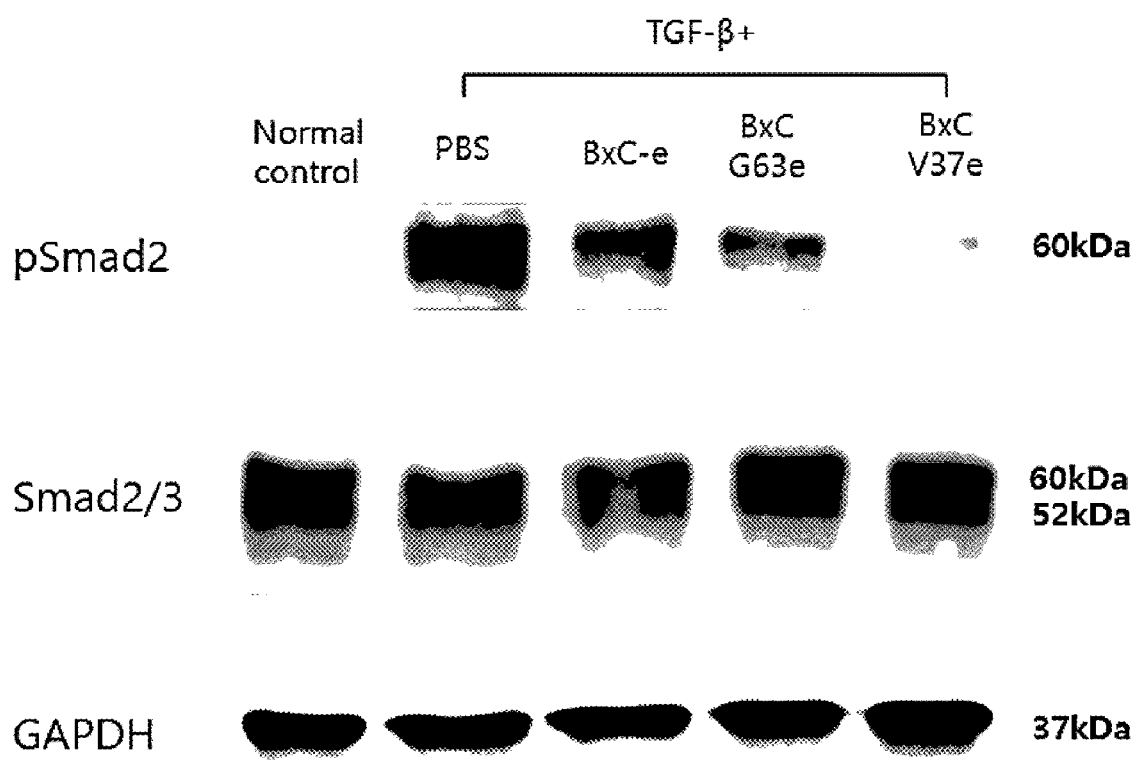
FIG. 11 is an image of western blots elucidating kidney fibrosis-inhibiting effects of exosomes (BxC-V37e) isolated from iPSC-derived MSC progenitor cells pretreated with lanifibranor as measured for inhibition against Smad2 phosphorylation in kidney failure-induced renal cells.

As can be seen in FIG. 11, the exosomes (BxC-e and BxC-V37e) of the present disclosure were found to inhibit the TGF-β-induced phosphorylation of Smad2 protein in renal cells in which kidney failure had been induced by treatment with TGFβ.

5.2.4. Regulation of Epithelial-Mesenchymal Transition (EMT) Pathway

Kidney epithelial cells were seeded at a density of 1×10$^5$ cells/well into 6-well culture dishes. At 16 hours after cell seeding, the cells were checked for the state thereof and treated for 24 hours with TGF-β (10 ng/mL), together with 100 μg of the exosomes (BxC-e) isolated in Example 1 or the exosomes (BxC-V37e) isolated from iPSC-derived MSC progenitor cells treated with lanifibranor, in a serum-free growth medium. As a positive control, a group in which kidney failure had been induced by treatment with TGF-β alone was used.

After 24 hours, the supernatant was discarded and the cells were washed with DPBS and treated with Trizol to isolate total RNA. Then, cDNA was synthesized from the RNA, using the primers of Table 11, followed by qRT-PCR assay for E-cadherin, N-cadherin, and vimentin gene expression.

TABLE 11

| No. | Name | Sequence (5'→3') | Note |
|---|---|---|---|
| 11 | Human_E-cadherin_Foward | GCTGGACCGAGAGAGTTTCC |  |
| 12 | Human_E-cadherin_Reverse | CGACGTTAGCCTCGTTCTCA |  |
| 13 | Human_N-cadherin_Foward | GACAATGCCCCTCAAGTGTT |  |
| 14 | Human_N-cadherin_Reverse | CCATTAAGCCGAGTGATGGT |  |
| 15 | Human_Vimentin_Foward | CTCCCTGAACCTGAGGGAAAC |  |
| 16 | Human_Vimentin_Reverse | TTGCGCTCCTGAAAAACTGC |  |

TABLE 12

|  | TGFβ− | TGFβ+ | TGFβ + e | TGFβ + v37e |
|---|---|---|---|---|
| E-cadherin mRNA (A.U.) | 1.39 | 0.74 | 0.79 | 0.9 |

TABLE 13

|  | TGFβ− | TGFβ+ | TGFβ + e | TGFβ + v37e |
|---|---|---|---|---|
| N-cadherin mRNA (A.U.) | 1.30 | 21.2 | 18.07 | 1.63 |

TABLE 14

|  | TGFβ− | TGFβ+ | TGFβ + e | TGFβ + v37e |
|---|---|---|---|---|
| Vimentin mRNA (A.U.) | 1.56 | 26.77 | 9.9 | 0.90 |

Figure 12A:
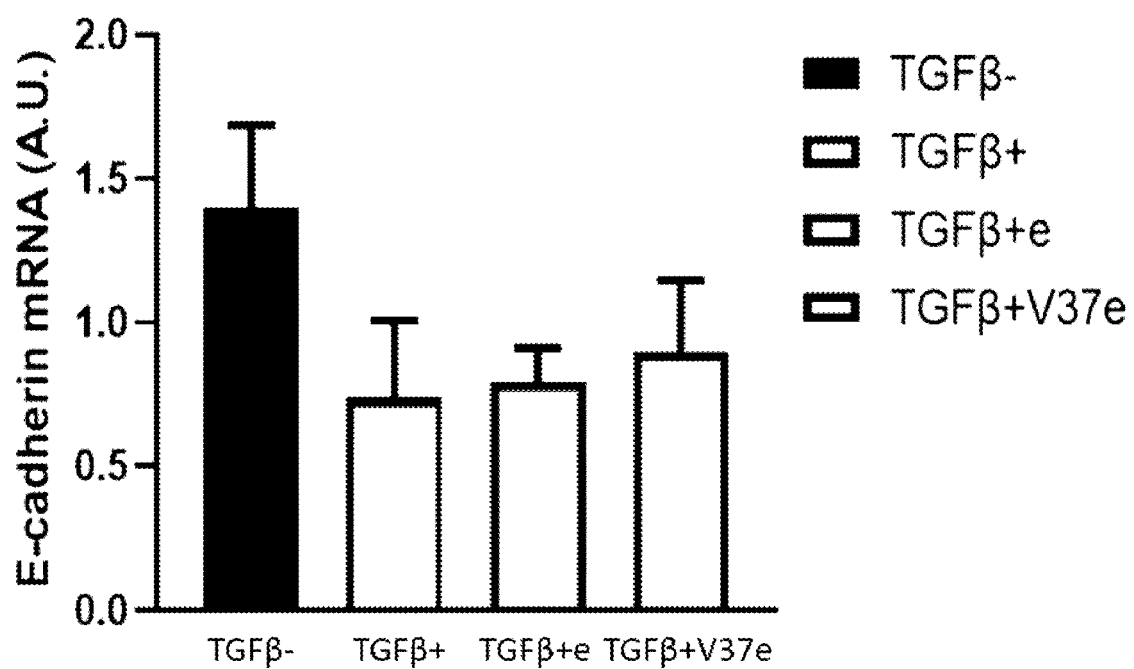
FIGS. 12a, 12b and 12c are graphs elucidating kidney fibrosis-inhibiting effects of exosomes (BxC-V37e) isolated from iPSC-derived MSC progenitor cells pretreated with lanifibranor in kidney failure-induced renal cells, as assayed for regulation of the epithelial-mesenchymal transition (EMT) pathway which is an important mechanism responsible for fibrosis of renal cells (wherein, *: $p<0.05$ vs. TGFβ—, #: $p<0.05$ vs. TGFβ+, and †: $p<0.05$ vs. TGFβ+e).
Figure 12B:
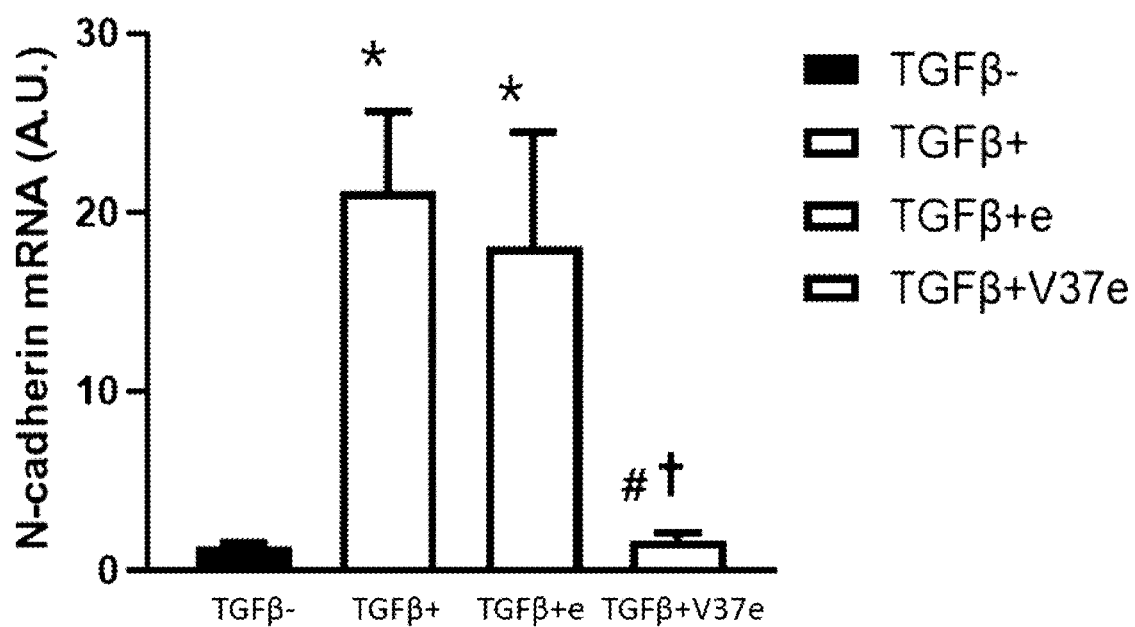
Figure 12C:
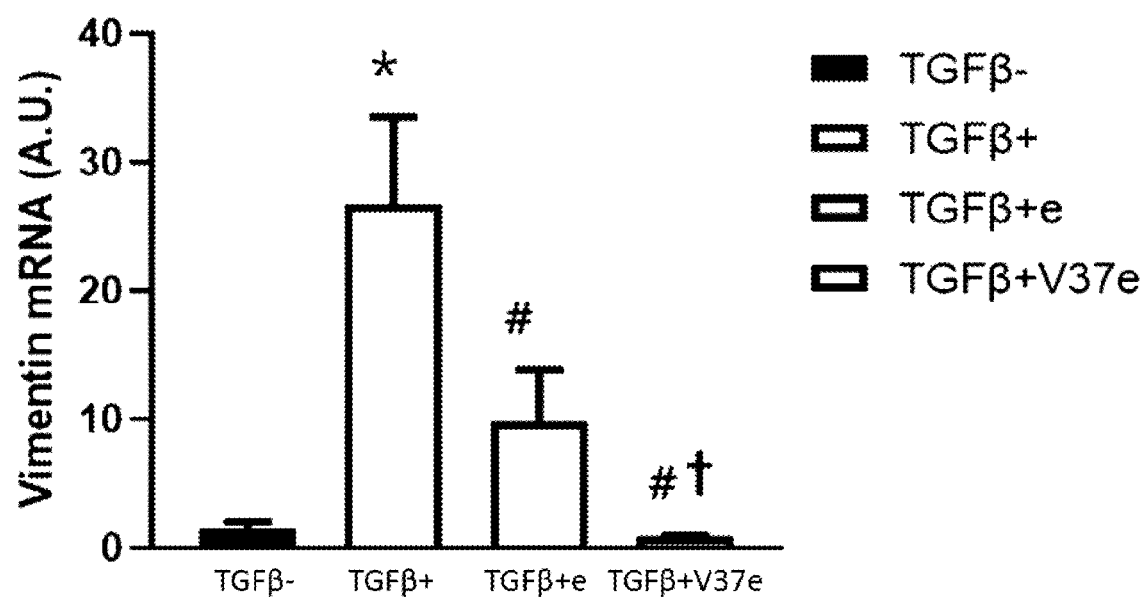

As can be seen in FIGS. 12a to 12c and Tables 12 to 14, the exosomes (BxC-e and BxC-V37e) of the present disclosure were found to effectively regulate the epithelial-mesenchymal transition (EMT) pathway, which is an important mechanism for fibrosis, in renal cells in which kidney failure had been induced by treatment with TGF-β.

5.2.5. Inhibition of mRNA Expression of Snail1 and Slug

Kidney epithelial cells were seeded at a density of $1 \times 10^5$ cells/well into 6-well culture dishes. At 16 hours after cell seeding, the cells were checked for the state thereof and treated for 24 hours with TGF-β (10 ng/mL), together with 100 µg of the exosomes (BxC-e) isolated in Example 1 or the exosomes (BxC-V37e) isolated from iPSC-derived MSC progenitor cells treated with lanifibranor, in a serum-free growth medium. As a positive control, a group in which kidney failure had been induced by treatment with TGF-β alone was used.

After 24 hours, the supernatant was discarded and the cells were washed with DPBS and treated with Trizol to isolate total RNA. Then, cDNA was synthesized from the RNA, using the primers of Table 15, followed by qRT-PCR assay for snail and slug gene expression.

TABLE 15

| No. | Name | Sequence (5'→3') | Note |
|-----|------|------------------|------|
| 17 | Human_Snail1_Foward | CCTGTCTGCGTGGGTTTTG | |
| 18 | Human_Snail1_Reverse | ACCTGGGGGTGGATTATTGC | |
| 19 | Human_Slug_Foward | ACTGGACACACATACAGTGATT | |
| 20 | Human_Slug_Reverse | ACTCACTCGCCCCAAAGATG | |

TABLE 16

| | TGFβ− | TGFβ+ | TGFβ + e | TGFβ + v37e |
|---|---|---|---|---|
| Snail1 mRNA (A.U.) | 1.3 | 104.2 | 101.7 | 6.8 |

TABLE 17

| | TGFβ− | TGFβ+ | TGFβ + e | TGFβ + v37e |
|---|---|---|---|---|
| Slug mRNA (A.U.) | 1.07 | 6.38 | 3.48 | 0.62 |

Figure 13A:
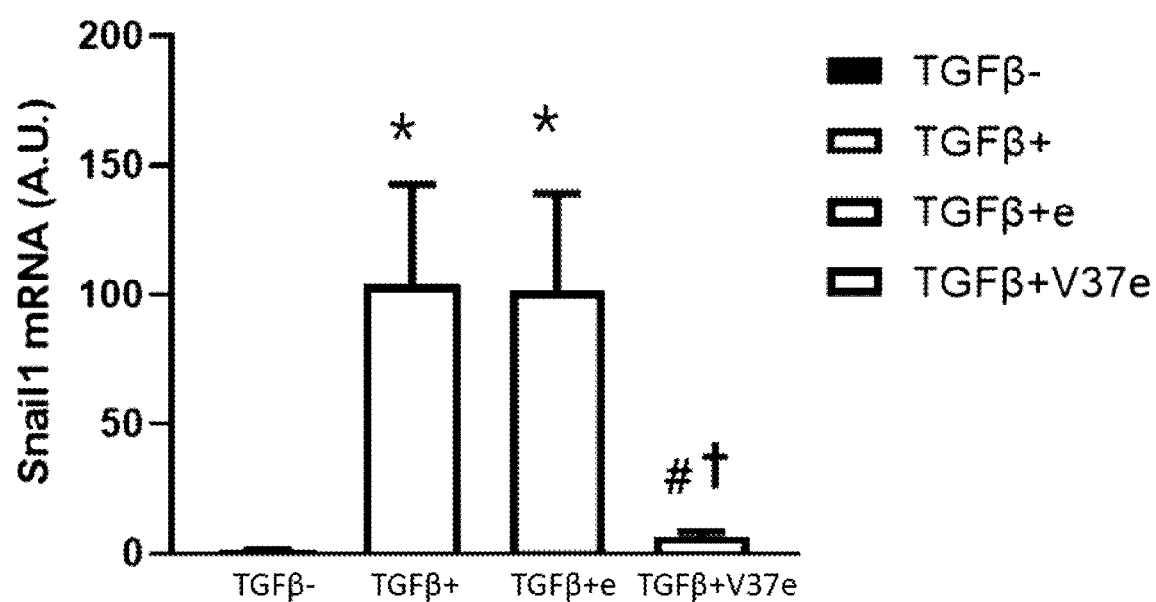
FIGS. 13a to 13b are graphs elucidating kidney fibrosis-inhibiting effects of exosomes (BxC-V37e) isolated from iPSC-derived MSC progenitor cells pretreated with lanifibranor in kidney failure-induced renal cells, as assayed for regulation of the signals (snail1 and slug mRNA expression) downstream of the epithelial-mesenchymal transition (EMT) pathway which is an important mechanism responsible for fibrosis of renal cells (wherein, *: $p<0.05$ vs. TGFβ—, #: $p<0.05$ vs. TGFβ+, and †: $p<0.05$ vs. TGFβ+e).
Figure 13B:
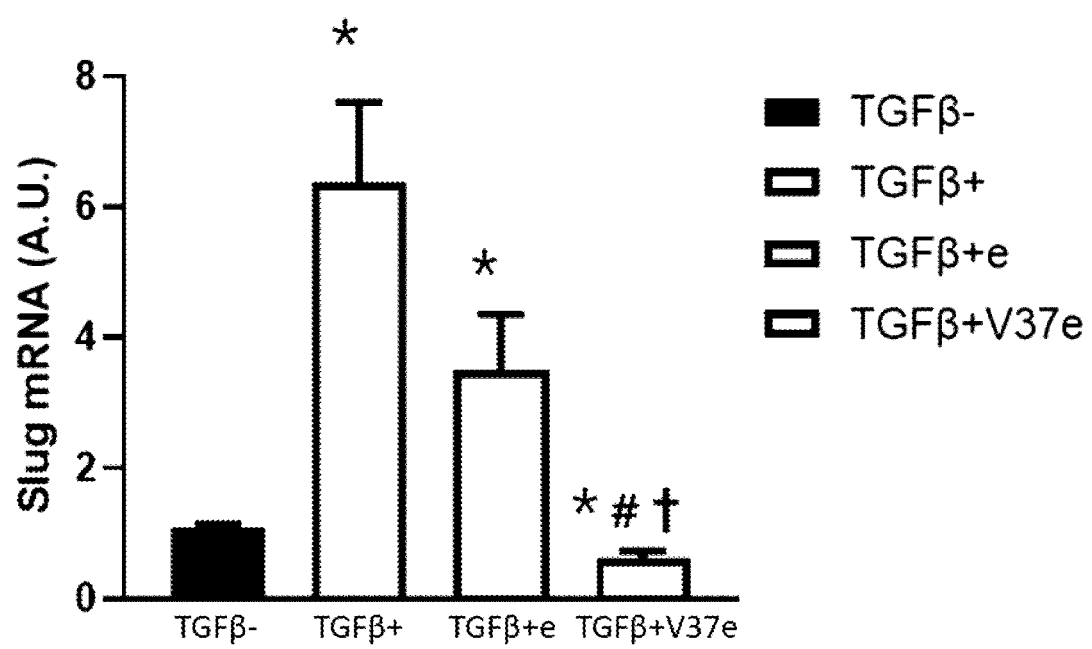

As can be seen in FIGS. 13a to 13b and Tables 16 and 17, the exosomes (BxC-e and BxC-V37e) of the present disclosure were found to effectively regulate snail and slug mRNA expression responsible for signals downstream of the epithelial-mesenchymal transition (EMT) pathway, which is an important mechanism for fibrosis, in renal cells in which kidney failure had been induced by treatment with TGF-β.

5.3 Function of Treating and Recovering from Renal Damage

The exosomes (BxC-V37e) isolated from iPSC-derived MSC progenitor cells pretreated with lanifibranor were examined for the function to treat and recover from renal damage in a mouse renal damage model in which kidney failure had been induced by cisplatin.

Cisplatin (15 mg/kg) was injected intraperitoneally into Balb/c male mice 8 weeks old to induce renal damage. After injection of cisplatin, the exosomes (BxC-V63e) isolated from iPSC-derived MSC progenitor cells treated with lanifibranor were administered IV. Three days later, a blood sample was taken and measured for creatinine and BUN levels to determine the ability of BxC-G63e to treat and recover from renal damage.

TABLE 18

| | Normal control | No treatment | BxC-V37e |
|---|---|---|---|
| BUN level (mg/dL) | 21.2 | 316 | 212 |

TABLE 19

| | Normal control | No treatment | BxC-V37e |
|---|---|---|---|
| Creatinine level (mg/dL) | 0.1 | 1.5 | 0.3 |

Figure 14A:
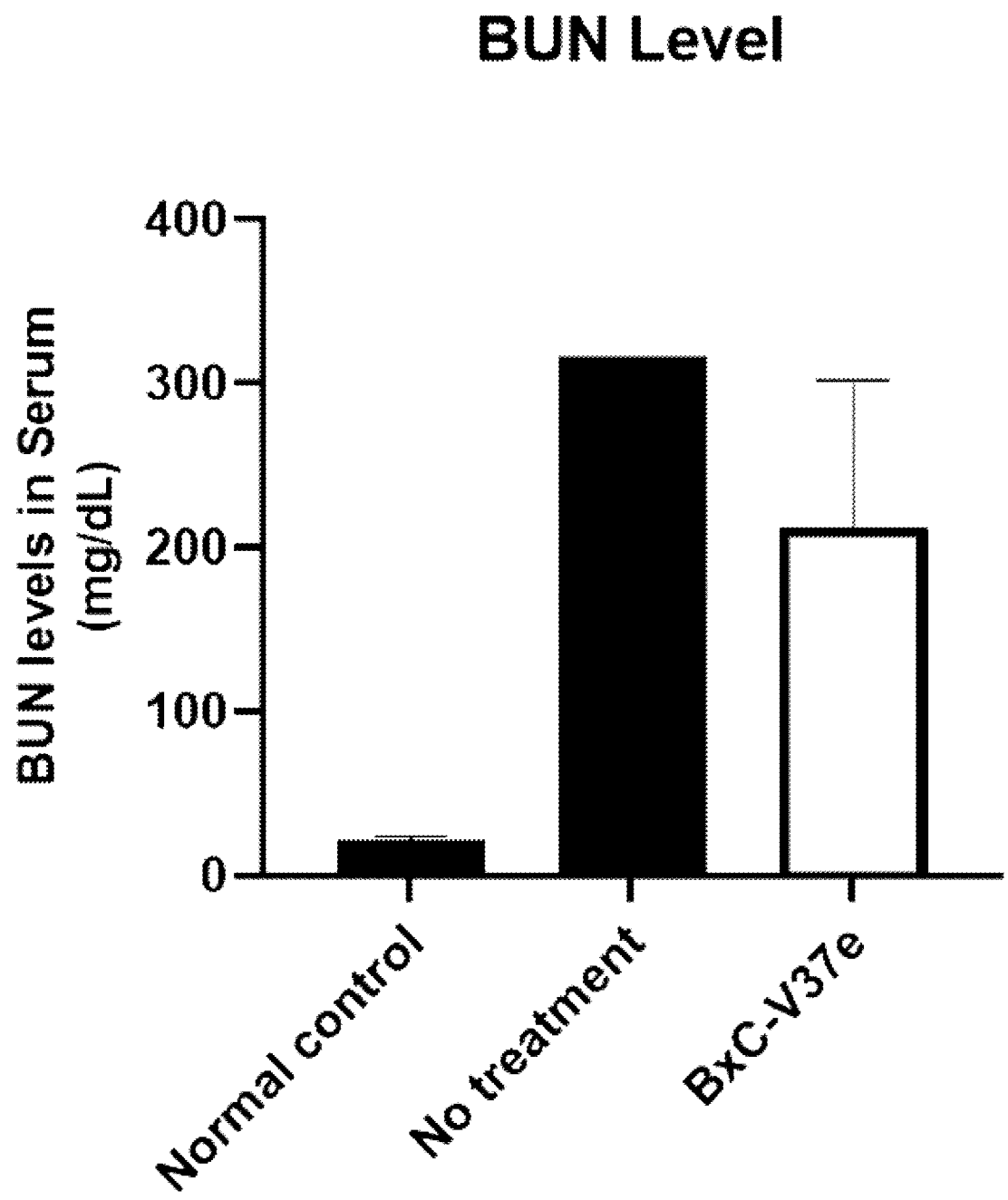
FIGS. 14a and 14b are graphs demonstrating that exosomes (BxC-V37e) isolated from iPSC-derived MSC progenitor cells (BxC) pretreated with lanifibranor have the function of treating and recovering from renal damage in kidney failure-induced renal cells.
Figure 14B:
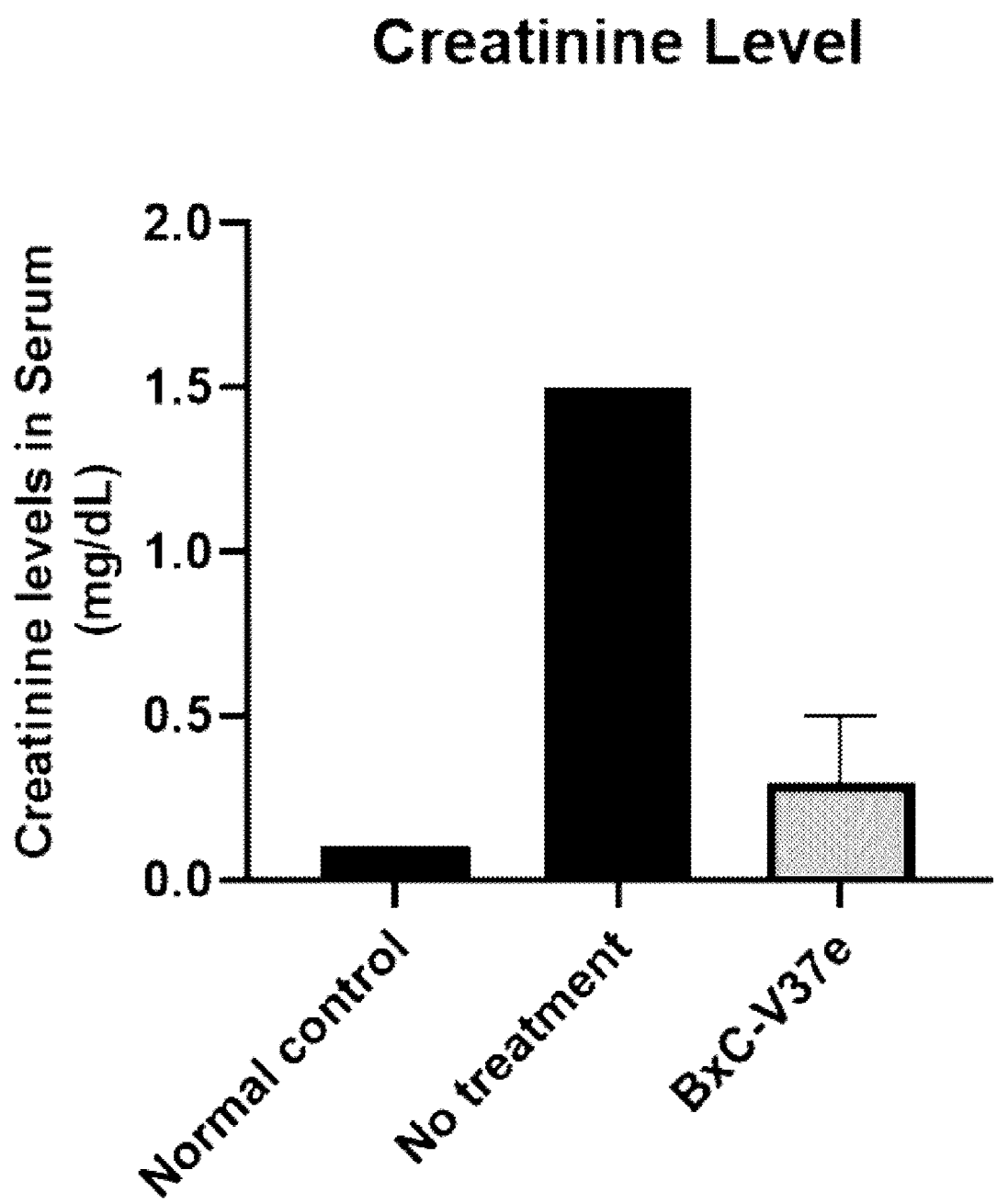

As is understood therefrom, the data of FIGS. 14a and 14b and Tables 18 and 19 show the ability of the exosomes (BxC-V37e) isolated from iPSC-derived MSC progenitor cells pretreated with exendin-4 to remarkably reduce the levels of blood urea nitrogen (BUN) and creatinine in the kidney, demonstrating that the BxC-V37e exosomes have an excellent effect of recovering the renal function from a damage state.

Conclusion

Taken together, the data obtained above imply that BxC-e, BxC-G63e, and BxC-V37e according to the present disclosure have excellent prophylactic or therapeutic efficacy as they are inhibitory of inflammation and apoptosis of kidney failure-induced renal cells as well as endoplasmic reticulum stress.

INDUSTRIAL APPLICABILITY

The present disclosure is concerned with a composition comprising exosomes isolated from iPSC-derived MSC progenitor cells treated with or without a pretreatment material as an active ingredient for preventing or treating kidney disease.

This application contains references to amino acid sequences and/or nucleic acid sequences which have been submitted concurrently herewith as the sequence listing text file entitled "000310usnp_SequenceListing.TXT", file size 4 kilobytes (KB), created on 29 Apr. 2022. The aforementioned sequence listing is hereby incorporated by reference in its entirety pursuant to 37 C.F.R. § 1.52(e)(5).

What is claimed is:

1. An exosome, isolated from pretreatment material-pretreated progenitor cells of induced pluripotent stem cell (iPSC)-derived mesenchymal stem cells (MSCs),
   wherein the progenitor cell of induced pluripotent stem cell-derived mesenchymal stem cell is pretreated for 12 to 36 hours, and
   wherein the pretreatment material is 10 to 100 nM of exendin-4 or 5 to 50 µM of lanifibranor.

2. A method for treating a kidney disease in a subject in need thereof, the method comprising:
   administering to the subject a composition comprising exosomes isolated from progenitor cells of induced pluripotent stem cell (iPSC)-derived mesenchymal stem cell (MSC),
   wherein the progenitor cell of induced pluripotent stem cell-derived mesenchymal stem cell is pretreated for 12 to 36 hours, and
   wherein the pretreatment material is 10 to 100 nM of exendin-4 or 5 to 50 µM of lanifibranor.

3. The method of claim 2, wherein the progenitor cells of mesenchymal stem cells express at least one gene selected from the group consisting of ANKRD1, CPE, NKAIN4, LCP1, CCDC3, MAMDC2, CLSTN2, SFTA1P, EPB41L3, PDE1C, EMILIN2, SULT1C4, TRIM58, DENND2A, CADM4, AIF1L, NTM, SHISA2, RASSF4, and ACKR3 at a higher level than an equal number of the mesenchymal stem cells.

4. The method of claim 2, wherein the progenitor cells of mesenchymal stem cells express at least one gene selected from the group consisting of DHRS3, BMPER, IFI6, PRSS12, RDH10, and KCNE4 at a lower level than an equal number of the mesenchymal stem cells.

5. The method of claim 2, wherein the kidney disease is selected from the group consisting of renal fibrosis, diabetic nephropathy, hypertensive nephropathy, glomerulitis, pyelonephritis, interstitial nephritis, lupus nephritis, polycystic kidney disease, kidney failure, glomerulosclerosis, acute rejection after transplantation, and drug-caused kidney damage.

6. A method for preventing or treating a kidney disease in a subject in need thereof, the method comprising:
   administering to the subject a composition comprising exosomes isolated from induced pluripotent stem cell (iPSC)-derived mesenchymal stem cell (MSC) progenitor cells treated with a pretreatment material,
   wherein the progenitor cell of induced pluripotent stem cell-derived mesenchymal stem cell is pretreated for 12 to 36 hours, and
   wherein the pretreatment material is 10 to 100 nM of exendin-4 or 5 to 50 µM of lanifibranor.

7. The method of claim 6, wherein the kidney disease is selected from the group consisting of renal fibrosis, diabetic nephropathy, hypertensive nephropathy, glomerulitis, pyelonephritis, interstitial nephritis, lupus nephritis, polycystic kidney disease, kidney failure, glomerulosclerosis, acute rejection after transplantation, and drug-caused kidney damage.

* * * * *

SEQUENCE LISTING

<160> NUMBER OF SEQ ID NOS: 20

<210> SEQ ID NO 1
<211> LENGTH: 20
<212> TYPE: DNA
<213> ORGANISM: Artificial Sequence
<220> FEATURE:
<223> OTHER INFORMATION: Human_Caspase-3_Foward

<400> SEQUENCE: 1
tctggttttc ggtgggtgtg                                               20

<210> SEQ ID NO 2
<211> LENGTH: 24
<212> TYPE: DNA
<213> ORGANISM: Artificial Sequence
<220> FEATURE:
<223> OTHER INFORMATION: Human_Caspase-3_Reverse

<400> SEQUENCE: 2
cgcttccatg tatgatcttt ggtt                                          24

<210> SEQ ID NO 3
<211> LENGTH: 20
<212> TYPE: DNA
<213> ORGANISM: Artificial Sequence
<220> FEATURE:
<223> OTHER INFORMATION: Human_Collagen1_Foward

<400> SEQUENCE: 3
cacagaggtt tcagtggttt                                               20

<210> SEQ ID NO 4
<211> LENGTH: 20
<212> TYPE: DNA
<213> ORGANISM: Artificial Sequence
<220> FEATURE:
<223> OTHER INFORMATION: Human_Collagen1_Reverse

<400> SEQUENCE: 4
gcaccagtag caccatcatt                                               20

<210> SEQ ID NO 5
<211> LENGTH: 20
<212> TYPE: DNA
<213> ORGANISM: Artificial Sequence
<220> FEATURE:
<223> OTHER INFORMATION: Human_CTGF_Foward

<400> SEQUENCE: 5
caagggcctc ttctgtgact                                               20

<210> SEQ ID NO 6
<211> LENGTH: 20
<212> TYPE: DNA
<213> ORGANISM: Artificial Sequence
<220> FEATURE:
<223> OTHER INFORMATION: Human_CTGF_Reverse

<400> SEQUENCE: 6
acgtgcactg gtacttgcag                                               20

<210> SEQ ID NO 7
<211> LENGTH: 23
<212> TYPE: DNA
<213> ORGANISM: Artificial Sequence

```
<220> FEATURE:
<223> OTHER INFORMATION: Human_aSMA_Foward

<400> SEQUENCE: 7
aggtaacgag tcagagcttt ggc                                              23

<210> SEQ ID NO 8
<211> LENGTH: 22
<212> TYPE: DNA
<213> ORGANISM: Artificial Sequence
<220> FEATURE:
<223> OTHER INFORMATION: Human_aSMA_Reverse

<400> SEQUENCE: 8
ctctctgtcc accttccagc ag                                               22

<210> SEQ ID NO 9
<211> LENGTH: 22
<212> TYPE: DNA
<213> ORGANISM: Artificial Sequence
<220> FEATURE:
<223> OTHER INFORMATION: Human_Fibronectin_Foward

<400> SEQUENCE: 9
aagattggag agaagtggga cc                                               22

<210> SEQ ID NO 10
<211> LENGTH: 20
<212> TYPE: DNA
<213> ORGANISM: Artificial Sequence
<220> FEATURE:
<223> OTHER INFORMATION: Human_Fibronectin_Reverse

<400> SEQUENCE: 10
gagcaaatgg caccgagata                                                  20

<210> SEQ ID NO 11
<211> LENGTH: 20
<212> TYPE: DNA
<213> ORGANISM: Artificial Sequence
<220> FEATURE:
<223> OTHER INFORMATION: Human_E-cadherin_Foward

<400> SEQUENCE: 11
gctggaccga gagagtttcc                                                  20

<210> SEQ ID NO 12
<211> LENGTH: 20
<212> TYPE: DNA
<213> ORGANISM: Artificial Sequence
<220> FEATURE:
<223> OTHER INFORMATION: Human_E-cadherin_Reverse

<400> SEQUENCE: 12
cgacgttagc ctcgttctca                                                  20

<210> SEQ ID NO 13
<211> LENGTH: 20
<212> TYPE: DNA
<213> ORGANISM: Artificial Sequence
<220> FEATURE:
<223> OTHER INFORMATION: Human_N-cadherin_Foward

<400> SEQUENCE: 13
gacaatgccc ctcaagtgtt                                                  20
```

<210> SEQ ID NO 14
<211> LENGTH: 20
<212> TYPE: DNA
<213> ORGANISM: Artificial Sequence
<220> FEATURE:
<223> OTHER INFORMATION: Human_N-cadherin_Reverse

<400> SEQUENCE: 14
ccattaagcc gagtgatggt                                                    20

<210> SEQ ID NO 15
<211> LENGTH: 21
<212> TYPE: DNA
<213> ORGANISM: Artificial Sequence
<220> FEATURE:
<223> OTHER INFORMATION: Human_Vimentin_Foward

<400> SEQUENCE: 15
ctccctgaac ctgagggaaa c                                                  21

<210> SEQ ID NO 16
<211> LENGTH: 20
<212> TYPE: DNA
<213> ORGANISM: Artificial Sequence
<220> FEATURE:
<223> OTHER INFORMATION: Human_Vimentin_Reverse

<400> SEQUENCE: 16
ttgcgctcct gaaaaactgc                                                    20

<210> SEQ ID NO 17
<211> LENGTH: 20
<212> TYPE: DNA
<213> ORGANISM: Artificial Sequence
<220> FEATURE:
<223> OTHER INFORMATION: Human_Snail1_Foward

<400> SEQUENCE: 17
cctgtctgcg tgggttttg                                                     20

<210> SEQ ID NO 18
<211> LENGTH: 20
<212> TYPE: DNA
<213> ORGANISM: Artificial Sequence
<220> FEATURE:
<223> OTHER INFORMATION: Human_Snail1_Reverse

<400> SEQUENCE: 18
acctgggggt ggattattgc                                                    20

<210> SEQ ID NO 19
<211> LENGTH: 22
<212> TYPE: DNA
<213> ORGANISM: Artificial Sequence
<220> FEATURE:
<223> OTHER INFORMATION: Human_Slug_Foward

<400> SEQUENCE: 19
actggacaca catacagtga tt                                                 22

```
<210> SEQ ID NO 20
<211> LENGTH: 20
<212> TYPE: DNA
<213> ORGANISM: Artificial Sequence
<220> FEATURE:
<223> OTHER INFORMATION: Human_Slug_Reverse

<400> SEQUENCE: 20
actcactcgc cccaaagatg                                          20
```